United States Patent [19]

Tozaki et al.

[11] Patent Number: 6,091,674
[45] Date of Patent: Jul. 18, 2000

[54] ACCESSING CONTROL FOR OPTICAL RECORDING DEVICE CAPABLE OF PERFORMING TIME SEARCH

[75] Inventors: Akihiro Tozaki, Tsurugashima; Takao Sawabe, Tokyo-to; Ryuichiro Yoshimura, Tokorozawa; Yoshiaki Moriyama; Kaoru Yamamoto, both of Tsurugashima; Hiroshi Nakamura; Junichi Yoshio, both of Tokorozawa, all of Japan

[73] Assignee: Pioneer Electronic Corporation, Tokyo-to, Japan

[21] Appl. No.: 08/822,157

[22] Filed: Mar. 17, 1997

[30] Foreign Application Priority Data

Mar. 18, 1996 [JP] Japan .................................. 8-061470

[51] Int. Cl.[7] .............................. G11B 17/22; G11B 7/24
[52] U.S. Cl. .......................................... 369/32; 369/275.3
[58] Field of Search .................................. 369/32, 275.3, 369/58, 47, 48; 386/91, 96, 106, 124, 125, 126

[56] References Cited

U.S. PATENT DOCUMENTS 5,457,669  10/1995  Kim et al. .................................. 369/32
5,691,972  11/1997  Tsuga et al. ............................... 369/32

FOREIGN PATENT DOCUMENTS 9-17127  1/1997  Japan .
9-23404  1/1997  Japan .

*Primary Examiner*—Tan Dinh
*Attorney, Agent, or Firm*—Morgan, Lewis & Bockius LLP

[57] ABSTRACT

The record information (42, 43, 44) and the access information (51: DSI) are recorded on a record track (1a) of an information record medium (1: DVD) such that the record information and the access information are divided into a plurality of first data groups (30: VOBU), each of which is a unit able to be accessed by an information reproducing apparatus (S2) and each of which comprises the record information and the access information, and are divided into a plurality of second data groups (20: CELL), each of which is a unit able to be logically divided in the reproduction and each of which comprises a series of the first data groups arranged along the record track among the first data groups. Management information (PGCI) are collectively recorded at one portion of the record track, and comprises: a plurality of time unit address informations (200) each indicating an address of respective one of the first data groups to which the record information in every predetermined time unit belongs; and discontinuity information (201) indicating whether or not two addresses, which are indicated to be apart from each other by one time unit by the time unit address informations, belong to a same one of the second data groups.

17 Claims, 15 Drawing Sheets

PHYSICAL STRUCTRE OF RECORD INFORMATION
(PHYSICAL FORMAT)

STRUCTURE OF INTERLEAVED UNIT

IU : INTERLEAVED UNIT

FIG. 6

CELL INFORMATION TABLE (IN EACH PGCI)

300

| DATA NAME | CONTENT | NUMBER OF BYTES |
|---|---|---|
| 301 — C_CAT | CELL CATEGORY | 4 |
| 302 — C_PBTM | CELL REPRODUCTION TIME | 4 |
| 303 — C_FVOBU_SA | START ADDRESS OF FIRST VOBU | 4 |
| 304 — C_LVOBU_SA | START ADDRESS OF LAST VOBU | 4 |

FIG. 7

VOBU SEARCH INFORMATION (IN EACH DSI PACKET) 400

| DATA NAME | CONTENT | NUMBER OF BYTES |
|---|---|---|
| FWDA240 | HEAD ADDRESS OF VOBU FORWARD BY 240 TIME UNITS | 4 |
| FWDA120 | HEAD ADDRESS OF VOBU FORWARD BY 120 TIME UNITS | 4 |
| FWDA60 | HEAD ADDRESS OF VOBU FORWARD BY 60 TIME UNITS | 4 |
| FWDA20 | HEAD ADDRESS OF VOBU FORWARD BY 20 TIME UNITS | 4 |
| FWDA15 | HEAD ADDRESS OF VOBU FORWARD BY 15 TIME UNITS | 4 |
| FWDA14 | HEAD ADDRESS OF VOBU FORWARD BY 14 TIME UNITS | 4 |
| --- | --- | --- |
| FWDA3 | HEAD ADDRESS OF VOBU FORWARD BY 3 TIME UNITS | 4 |
| FWDA2 | HEAD ADDRESS OF VOBU FORWARD BY 2 TIME UNITS | 4 |
| FWDA1 | HEAD ADDRESS OF VOBU FORWARD BY 1 TIME UNITS | 4 |
| BWDA1 | HEAD ADDRESS OF VOBU BACKWARD BY 1 TIME UNITS | 4 |
| BWDA2 | HEAD ADDRESS OF VOBU BACKWARD BY 2 TIME UNITS | 4 |
| BWDA3 | HEAD ADDRESS OF VOBU BACKWARD BY 3 TIME UNITS | 4 |
| --- | --- | --- |
| BWDA14 | HEAD ADDRESS OF VOBU BACKWARD BY 14 TIME UNITS | 4 |
| BWDA15 | HEAD ADDRESS OF VOBU BACKWARD BY 15 TIME UNITS | 4 |
| BWDA20 | HEAD ADDRESS OF VOBU BACKWARD BY 20 TIME UNITS | 4 |
| BWDA60 | HEAD ADDRESS OF VOBU BACKWARD BY 60 TIME UNITS | 4 |
| BWDA120 | HEAD ADDRESS OF VOBU BACKWARD BY 120 TIME UNITS | 4 |
| BWDA240 | HEAD ADDRESS OF VOBU BACKWARD BY 240 TIME UNITS | 4 |

(TOTAL 152 BYTES)

PGC HAVING INTERACTIVE STRUCTURE

DATA STRUCTURE OF DSI

| CONTENT | NUMBER OF BYTES |
|---|---|
| DSI GENERAL INFORMATION | 32 BYTES |
| SEAMLESS REPRODUCTION INFORMATION | 146 BYTES |
| ANGLE INFORMATION FOR SEAMLESS | 36 BYTES |
| VOBU SEARCH INFORMATION | 152 BYTES |
| INFORMATION FOR SYNCHRONOUS REPRODUCTION INFORMATION | 144 BYTES |
| RESEARVED AREA FOR SYSTEM EXPANSION | 507 BYTES |

400

ACCESSING CONTROL FOR OPTICAL RECORDING DEVICE CAPABLE OF PERFORMING TIME SEARCH

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating time to reproduce each information with respect to a reproduction start position provided in each of the LD and the like as a standard. Therefore, the reproducing apparatus can easily perform a so-called "time search (or time-based search)" to search a recording position on the disk corresponding to an arbitrary time designated or specified by the audience, with reference to this time information. Further, other than a normal reproduction of the recorded data to reproduce the recorded information in the order of recording, special reproductions such as a reproduction in which the audience can select and listen to only desirable music among the musics recorded on the CD, a reproduction in which the audience can listen to the musics in a random reproducing order and so on, are possible on the basis of this time information.

However, there is such a problem in the above mentioned LD, CD and the like that an interactive and variegated reproduction is not possible in which the audience has several options as for the video image to be displayed or the audio sound to be reproduced, and the audience can listen to desirable one by selecting them.

More particularly, the above mentioned LD, CD or the like is not capable of interactive reproduction to output different types of video images or audio sounds depending on the contents of the "answer" inputted by the audience in response to a "question". Such interactive reproduction is often seen in recent game or educational software used in a personal computer. For example, if the answer is correct, an video image and an audio sound corresponding to the right answer are reproduced, and if the answer is incorrect, a video image and an audio sound corresponding to the incorrect answer are reproduced.

Meanwhile, various proposals and developments are being made as for the interactive reproduction of the DVD, which is an optical disk having an increased memory capacity ten times as much as that of the conventional CD without changing the size of the optical disk itself. In case of recording information onto this DVD, it is preferable to compress the videodata etc. during recording, in order to use the memory capacity efficiently and increase the amount of information stored in the disk. Regarding the data compression technique utilized here, the image data compression technique called as the MPEG (Moving Picture Expert Group) 2 method, which is capable of changing the compression rate in correspondence with the contents of video data, is outstanding from viewpoints of its high compression efficiency and its high reproducibility.

However, according to the research by the present inventors, it was found that, if data is compressed and recorded on the record medium, such as the DVD or the like, with variable compression rate by use of the MPEG 2 method, the relationship between the time and the recording position is lost (i.e., it is unknown which information is recorded at which recording position, and is corresponding to what time). Accordingly, it is expected that it becomes difficult for the reproducing apparatus to move the optical pickup to the appropriate recording position corresponding to designated time for the time search. Actuality is such that this problem itself, i.e., the difficulty in the time search with respect to the DVD containing the compressed data with variable compression rate, is not even recognized by those skilled in the art.

The present inventors paid attention to this difficulty, which has not been known to the public yet, in an earlier stage than others, and proposed the following methods in Japanese Patent Application No. Hei. 7-170913 (not laid open yet):

(I) a method for conducting the time search, wherein first address information indicative of the start address of pre compressed primary data (e.g., video data) of every predetermined time unit (e.g., every 10 seconds) is recorded at a portion of the record medium different from the primary data recorded area, and the time search is conducted by the time unit with reference to the first address information;

(II) a method for conducting time search, wherein second address information indicative of the start address of compressed data of every compressed time unit (e.g., every data for 0.5 seconds), in addition to the above mentioned first address information, is recorded at a portion of the record medium different from the primary data recorded area, and the time search is initially conducted roughly by the time unit with reference to the first address information, and is further conducted, from the roughly searched position, finely by the compression time unit with reference to the second address information; and (III) a method for conducting time search, wherein the above mentioned second address information and the number of the data frames (data unit composed of primary data of a certain time period) constituting the compression unit indicated by the second address are recorded at a portion of the record medium different from the primary data recorded area, without recording the above mentioned first address information, and the number of the data frames is counted and summed up to convert the number of the data frames to the time period, so that the time search is conducted in accordance with the converted time period.

In the above mentioned method (I), the search by every time unit is performed quickly by using a simple algorithm. However, in case of designating the time more minute than the time unit, the audience must just wait for the time normally elapsed while actually reproducing the information. If the time unit itself is shortened, this waiting time could be reduced on the whole. However, supposing that four bytes is required to indicate each address by the time unit of 1 second, the 120 minutes source requires:

(120 [min]×60 [sec])/1 [sec]×4 [bytes]=28800 [bytes].

Thus, in order to realize the time search of the above mentioned method (I), the reproducing apparatus must have a memory of 28800 bytes.

According to the above mentioned method (II), after the rough search is initially conducted by the time unit of the method (I), the fine search is repeatedly conducted from the roughly searched position by the compressed unit. Thus, the fine time search is possible. However, assuming that the rough time unit is set to 10 seconds and the compressed unit is set to the data for 0.5 seconds, if four bytes are required to indicate each data, the 120 minute source requires:

$$(120 \text{ [min]} \times 60 \text{ [sec]})/10 \text{ [sec]} \times 4 \text{ [bytes]} + \\ (120 \text{ [min]} \times 60 \text{ [sec]})/0.5 \text{ [sec]} \times 4 \text{ [bytes]} = \\ 60480 \text{ [bytes]}.$$

Thus, in order to realize the time search of the above mentioned method (II), the reproducing apparatus must have a memory of 60480 bytes.

The above mentioned method (III) allows quick search to the extent of the compressed unit. However, assuming that the compressed unit is set to the data for 0.5 seconds, if four bytes are required to indicate each address and one byte is required to indicate the number of the data frames, the 120 minute source requires:

(120 [min]×60 [sec])/0.5 [sec]×(4 [bytes]+1 [byte])= 72000 [bytes].

Thus, in order to realize the time search of the above mentioned method (III), the reproducing apparatus must have a memory of 72000 bytes.

In this manner, according to the methods proposed by the applicant in Japanese Patent Application No. Hei. 7-170913, if the fine time search is conducted, the load on the hardware such as the necessary memory capacity of the reproducing apparatus would be fairly large.

SUMMARY OF THE INVENTION

It is therefore an object of the invention to provide: an information record medium, which allows the record information to be quickly time searched (i.e., quickly searched on the time basis) by an information reproducing apparatus having a relatively simple structure, regardless of the recording method, such as a variable rate compression, a fixed rate compression, a non-compression and so on; an information recording apparatus for recording the record information onto the information record medium; and an information reproducing apparatus having a relatively simple structure, which can quickly time search and time scan, on the time basis, the record information recorded on the information record medium.

The above object of the present invention can be achieved by an information record medium having a record track recorded with record information to be reproduced by an information reproducing apparatus provided with a read device, performs a reproduction of the record information while relatively moving the read device along the record track and is able to perform a time search of moving the read device across the record track on the basis of access information to access the record information. The information record medium comprises a data structure stored in the information record medium and including: the record information and the access information recorded on the record track such that the record information and the access information are divided into a plurality of first data groups, each of which is a unit able to be accessed by the information reproducing apparatus and each of which comprises the record information and the access information, and are divided into a plurality of second data groups, each of which is a unit able to be logically divided in the reproduction by the information reproducing apparatus and each of which comprises a series of the first data groups arranged along the record track among the first data groups; and management information collectively recorded at one portion of the record track, and comprising a plurality of time unit address informations each indicating an address of respective one of the first data groups to which the record information in every predetermined time unit belongs, and discontinuity information indicating whether or not two addresses, which are indicated to be apart from each other by one time unit by the time unit address informations, belong to a same one of the second data groups, for every time unit address information. The access information comprises first data group search information indicating addresses of the series of the first data groups, which belong to a same one of the second data groups to which the first data group including the access information belongs, more finely than the predetermined time unit.

According to the information record medium of the present invention, the record information, such as video information, audio information etc., and the access information, such as navigation information or DSI (which is described later) etc., are recorded on the record track such that the record information and the access information are divided into the first data groups, such as VOBUs (which is described later) etc., and the second data groups, such as cells (which is described later). Each of the first data groups is a unitable to be accessed by the information reproducing apparatus, and comprises the record information and the access information. Each of the second data groups is a unit able to be logically divided in the reproduction by the information reproducing apparatus, and comprises a series of the first data groups arranged along the record track among the first data groups. The management information, such as PGCI or control information (which is described later) etc., comprises the time unit address informations and the discontinuity information. Each of the time unit address informations indicates an address of respective one of the first data groups, to which the record information in every predetermined time unit (e.g., every 10 seconds) belongs. The discontinuity information indicates whether or not two addresses, which are indicated to be apart from each other by one time unit by the time unit address informations, belong to a same one of the second data groups, for every time unit address information. The management information having the above described structure is collectively recorded at one portion of the record track. On the other hand, the access information comprises the first data group search information, such as VOBU search information (which is described later) etc., The first data group information indicates addresses of the series of the first data groups, which belong to a same one of the second data groups to which the first data group including the access information belongs, more finely (e.g., for each 0.5 seconds) than the predetermined time unit.

As a result, it is possible for the information reproducing apparatus to firstly reproduce the time unit address informations and the discontinuity information, and to select, on the basis of these firstly reproduced informations, one time unit address, which indicates the first data group having the access information including the first data group search information indicating the address corresponding to the target time, among the time unit addresses, as an address of the first data group to be set as a target for a relatively rough time search (i.e. the primary search target), which is performed relatively roughly for every predetermined time unit (e.g., every 10 seconds). After that, by actually moving the read device to this primary search target and reproducing the first data group search information included in the access information at this primary search target, the address corresponding to the target time is always included in the addresses indicated by the reproduced first data group search information. Thus, it is possible for the information reproducing apparatus to quickly perform a fine time search to the address corresponding to the target time by a fine time unit (e.g., by a time unit of 0.5 seconds), in accordance with this reproduced first data group search information. At this time, especially, on the basis of the discontinuity information, it is possible to easily and quickly determine a case where the time unit address corresponding to the target time and the address corresponding to the target time are surely within the same second data group. And that, in such a case, this time unit address can be set as the address of the primary search target as it is. On the other hand, only in case that it is not sure by this judgment whether or not these two addresses are within the same second data group, a further judgment as to whether or not these two addresses are within the same second data group is performed. Further, after that, only in case that it is judged that these two addresses are within different second data groups, a relatively complicated and cumbersome process to change the time unit address corresponding to the target time to another time unit address within the second data group, in which the address corresponding to the target time is included, is performed. Therefore, the complicated and cumbersome processes are performed in the minimum required cases, so that a prompt search can be possible as a whole. Especially, as the larger is the size of the second data group relative to the size of the first data group, the larger is the reduction of the cases where the cumbersome processes are to be performed.

In summary, according to the information record medium of the present invention, the target of the rough search can be quickly determined based on the time unit address information and the discontinuity information. Further, the fine search in more minute time unit can be promptly and reliably conducted based on the first data group search information included in this target. Especially, because the cumbersome processes are suppressed as little as possible by using the discontinuity information, the prompt search can be achieved as a whole. The larger the size of the second data group relative to the size of the first data group, the larger the reduction rate of the cumbersome processes.

In one aspect of the information record medium of the present invention, the time unit address informations are recorded such that, if the time search into one of the second data groups which contains one address indicated by one of the time unit address informations is prohibited, the one address is written by use of a specific value to indicate a prohibition of the time search.

According to this aspect, by reproducing the time unit address information in advance and detecting the address of the specific value such as "0") (i.e., a value which cannot be actually exists for the address), it is possible for the information reproducing apparatus to judge that the time search into the second data group including this address is prohibited, so that the process to prohibit the time search in correspondence with this judgment result can be performed in advance of actually moving the reading device to the specified target time of the time search.

In this manner, by checking the time unit address information, it is possible to perform the process to prohibit the time search before the reading device is actually moved to the target location corresponding to the specified time, which is great deal of convenience to the audience.

In another aspect of the information record medium of the present invention, the management information comprises second data group information indicating a reproduction time of each second data group, an address of respective one of the first data groups which is located at a head of the each second data group, and an address of respective one of the first data groups which is located at an end of the each second data group.

According to this aspect, by reproducing the second data group information, such as a cell information table (described later) etc., included in the management information in advance, it is possible for the information reproducing apparatus to judge to which second data group the address corresponding to the specified target time of the time search is included, on the basis of this reproduced second data group information, so that the time unit address, which is varied depending upon this judgment result, can be set as the primary target of the time search.

As a result, the prompt search can be performed as a whole.

In another aspect of the information record medium of the present invention, at least a part of the record information is compressed and recorded on the record track with variable compression rate, and the time unit is pre-compression time unit.

According to this aspect, since, as for the part of the record information which is compressed and recorded on the record track with the variable compression rate, e.g., compressed and recorded by the MPEG 2 method, the time unit is the pre-compression time unit, it is possible for the information reproducing apparatus to perform the stepwise and prompt time search on the basis of the time unit address information and the first data group search information, in the same manner as the case of recording with fixed or constant compression rate or recording without compression.

As a result, this is a big advantage in the time search for the video information recorded in the DVD using the MPEG 2 method.

The above object of the present invention can be also achieved by an information recording apparatus for recording information onto an information record medium having a record track recorded with record information to be reproduced by an information reproducing apparatus, which is provided with a read device, performs a reproduction of the record information while relatively moving the read device along the record track and is able to perform a time search of moving the read device across the record track on the basis of access information to access the record information. The information recording apparatus is provided with: an access information generation device for generating the access information corresponding to the record information; and a record device for recording the record information and the access information onto the record track such that the record information and the access information are divided into a plurality of first data groups, each of which is a unit able to be accessed by the information reproducing apparatus and each of which comprises the record information and the access information, and are divided into a plurality of second data groups, each of which is a unit able to be logically divided in the reproduction by the information reproducing apparatus and each of which comprises a series of the first data groups arranged along the record track among the first data groups, for further recording management information collectively at one portion of the record track, the management information comprising a plurality of time unit address informations each indicating an address of respective one of the first data groups to which the record information in every predetermined time unit belongs, and discontinuity information indicating whether or not two addresses, which are indicated to be apart from each other by one time unit by the time unit address informations, belong to a same one of the second data groups, for every time unit address information, and for still further recording first data group search information so as to be included in the access information, the first data group search information indicating addresses of the series of the first data groups, which belong to a same one of the second data groups to which the first data group including the access information belongs, more finely than the predetermined time unit.

According to the information recording apparatus of the present invention, the access information corresponding to the record information is generated by the access information generation device. Then, the record information and the access information are recorded, by the record device, onto the record track such that the record information and the access information are divided into the first data groups and the second data groups. Each of the first data group is a unit able to be accessed by the information reproducing apparatus and comprises the record information and the access information. Each of the second data groups is a unit able to be logically divided in the reproduction by the information reproducing apparatus and comprises a series of the first data groups arranged along the record track among the first data groups. At this time, the management information is collectively recorded at one portion of the record track. The management information comprises the time unit address informations and the discontinuity information. Each of the time unit address informations indicates an address of respective one of the first data groups to which the record information in every predetermined time unit belongs. The discontinuity information indicates whether or not two addresses, which are indicated to be apart from each other by one time unit by the time unit address informations, belong to a same one of the second data groups, for every time unit address information. Further at this time, the first data group search information is recorded so as to be included in the access information. The first data group search information indicates addresses of the series of the first data groups, which belong to a same one of the second data groups to which the first data group including the access information belongs, more finely than the predetermined time unit. Accordingly, the above described information record medium of the present invention can be recorded.

In one aspect of the information recording apparatus of the present invention, the apparatus is further provided with an input device for inputting a search prohibit information to prohibit the time search into an arbitrary one of the second data groups. And that, the record device records the time unit address informations such that, if the time search into one of the second data groups which contains one address indicated by one of the time unit address informations is prohibited by the search prohibit information, said one address is written by use of a specific value.

According to this aspect, when the search prohibit information is inputted by the input device, one address is written by use of a specific value such as "0", if the time search into one of the second data groups which contains said one address indicated by one of the time unit address informations is prohibited. Accordingly, the above described one aspect of the information record medium of the present invention can be recorded.

In another aspect of the information recording apparatus of the present invention, the record device compresses and records at least a part of the record information on the record track with variable compression rate, and the time unit is pre-compression time unit.

According to this aspect, since at least a part of the record information is recorded on the record track with the variable compression rate, the above described information record medium of the present invention can be recorded.

The above object of the present invention can be also achieved by an information reproducing apparatus for reproducing the above described information record medium of the present invention. The information reproducing apparatus is provided with: a read device for reading information recorded at a predetermined read position on the record track; a movement device for relatively moving the read device along the record track or across the record track; a demodulation device for demodulating the information read by the read device; a specification device for specifying a target time for the time search; a target set device for (i) judging whether the discontinuity information corresponding to the target time indicates a continuity or discontinuity when the target time is specified by the specification device, (ii) setting an address indicated by the time unit address information corresponding to the target time as a primary search target if it is judged to indicate the continuity, (iii) judging whether or not one of the second data groups, which includes the address indicated by the time unit address information corresponding to the target time, and one of the second data groups, which includes the address corresponding to the target time, are coincident to each other if it is judged to indicate the discontinuity, (iv) setting the address indicated by the time unit address information corresponding to the target time as the primary search target if it is judged to be coincident, and (v) setting an address, which is apart by one time unit from the address indicated by the time unit address information corresponding to the target time, as the primary search target if it is not judged to be coincident; and a control device for controlling the movement device, the read device and the demodulation device to (i) move the read device to the set primary search target, (ii) read and demodulate the first data group search information included in the access information of one of the first data groups which is located at the primary search target, and (iii) further move the read device toward the address corresponding to the target time from the primary search target within one of the second data groups in accordance with the demodulated first data group search information.

According to the information reproducing apparatus of the present invention, the information recorded at a predetermined read position on the record track is read by the read device, which is relatively moved along the record track by the movement device. Then, the information read by the read device is demodulated by the demodulation device. Here, when the target time for the time search is specified by the specification device, it is judged whether the discontinuity information corresponding to the target time indicates a continuity or discontinuity, by the target set device. As a result of this judgment, if it is judged to indicate the continuity, the address indicated by the time unit address information corresponding to the target time is set as the primary search target. On the other hand, as the result of this judgment, if it is judged to indicate the discontinuity, it is further judged whether or not one of the second data groups, which includes the address indicated by the time unit address information corresponding to the target time, and one of the second data groups, which includes the address corresponding to the target time, are coincident to each other. As a result of this judgment, if it is judged to be coincident, the address indicated by the time unit address information corresponding to the target time is set as the primary search target. On the other hand, if it is not judged to be coincident, the address, which is apart by one time unit from the address indicated by the time unit address information corresponding to the target time, is set as the primary search target. Therefore, in either one of the above mentioned cases, the address corresponding to the target time is always included in the addresses indicated by the first data group search information included in the access information of the first data group, which is indicated by the address of the primary search target. Accordingly, under the control of the control device, the read device is moved to the primary search target which is set in the above explained manner (e.g., the rough search corresponding to the predetermined time unit such as 10 seconds is performed). After that, by the read device, the movement device and the demodulation device, the first data group search information included in the access information of the first data group, which is located at the primary search target, is read and searched. Then, the read device is moved toward the address corresponding to the target time from the primary search target within one of the second data groups, in accordance with the demodulated first data group search information (e.g., the fine search corresponding to the time unit finer than the predetermined time unit, such as 0.5 seconds is performed). Thus, the read device can be certainly and reliably moved to the address corresponding to the target time.

In the above processes, especially by referring to the discontinuity information, it is possible for the target set device to easily and quickly determine a case where the time unit address corresponding to the target time and the address corresponding to the target time are surely within the same second data group. And that, in such a case, this time unit address can be set as the address of the primary search target as it is. On the other hand, only in case that it is not sure by this judgment whether or not these two addresses are within the same second data group, a further judgment as to whether or not these two addresses are within the same second data group is performed by the target set device. Further, after that, only in case that it is judged that these two addresses are within different second data groups, a relatively complicated and cumbersome process to change the time unit address corresponding to the target time to another time unit address within the second data group, in which the address corresponding to the target time is included, is performed by the target set device. Therefore, because the cumbersome processes are suppressed as little as possible in the target set device, the prompt search can be achieved as a whole. Especially, the larger the size of the second data group relative to the size of the first data group, the larger the reduction rate of the cumbersome processes.

In summary, the primary search target of the time search can be promptly set on the basis of the time unit address informations and the discontinuity information, and the prompt and sure search can be performed by the finer time unit on the basis of the first data group information at the primary search target.

In one aspect of the information reproducing apparatus of the present invention, the time unit address informations are recorded such that, if the time search into one of the second data groups which contains one address indicated by one of the time unit address informations is prohibited, the one address is written by use of a specific value to indicate a prohibition of the time search. The target set device judges whether or not the address indicated by the time unit address information corresponding to the target time has the specific value, when the target time is specified by the specification device. And that, the control device performs no control to move the read device to the primary search target in correspondence to the target time if it is judged to have the specific value by the target set device.

According to this aspect, when the target time is specified by the specification device, it is judged by the target set device whether or not the address indicated by the time unit address information corresponding to the target time has the specific value such as "0". As a result of this judgment, if it is the specific value, no control is performed in correspondence with the target time, with respect to the read device, the movement device or demodulation device. Namely, the read device is not moved to the primary search target.

In another aspect of the information reproducing apparatus of the present invention, the management information comprises second data group information indicating a reproduction time of each second data group, an address of respective one of the first data groups which is located at a head of the each second data group, and an address of respective one of the first data groups which is located at an end of the each second data group. The target set device judges whether or not one of the second data groups, which includes the address indicated by the time unit address information corresponding to the target time, and one of the second data groups, which includes the address corresponding to the target time, are coincident to each other, on the basis of the second data group information.

According to this aspect, it can be easily judged by the target set device whether or not the second data group, which includes the address indicated by the time unit address information corresponding to the target time, and the second data group, which includes the address corresponding to the target time, are coincident to each other.

Accordingly, by reproducing the second data group information in advance, the primary search target can be set on the basis of this information content, so that the prompt time search can be performed as a whole.

In another aspect of the information reproducing apparatus of the present invention, the control device controls the read device, the movement device and the demodulation device to read and demodulate the time unit address informations and the discontinuity information in advance of the time search. And that, the target set device is provided with a memory for storing the time unit address informations and the discontinuity information demodulated in advance, and performs a judgment by use of the stored informations.

According to this aspect, under the control of the control device, the time unit address informations and the discontinuity information are read and demodulated in advance of performing the time search, by the read device, the movement device and the demodulation device. Then, these time unit address informations and the discontinuity information demodulated in advance are stored in the memory. Then, at the time of time search, the judgment is performed by the target set device with reference to these stored informations. Accordingly, the prompt judgment can be performed when the time search is specified by the input device.

As a result, on the basis of the time unit address informations and the discontinuity information stored in the memory, the prompt time search can be realized.

In another aspect of the information reproducing apparatus of the present invention, at least a part of the record information is compressed and recorded on the record track with variable compression rate, and the time unit is pre-compression time unit. And that, the demodulation device expands and demodulates the record information read by the read device.

According to this aspect, the record information, such as the video information, the audio information etc., read by the read device is expanded and demodulated by the demodulation device. Therefore, it is possible to perform the step-wise and prompt time search on the basis of the time unit address information and the first data group search information, as for the part of the record information compressed with the variable compression rate, in the same manner as the case of recording with fixed or constant compression rate or recording without compression.

As a result, it is possible to perform the prompt time search with respect to the video information recorded by the MPEG 2 method, for example.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a perspective view of the DVD in FIG. 1;

FIG. 6 is a table showing a data structure of a cell information table constructed in the DVD in FIG. 1;

FIG. 7 is a table showing a data structure of a VOBU search information constructed in the DVD in FIG. 1;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

first data group: VOBU (VOB (Video OBject)-Unit)
second data group: cell
management information PGCI (ProGram Chain Information)
access information: DSI (Data Search Information)
second data group
information: cell information table (in PGCI)
first data group
  search information: VOBU search information (I) Embodiment of Information Record Medium First of all, a physical structure and a logical structure as well as an operation of a DVD, as one embodiment of the information record medium to which the present invention is applied, will be explained with reference to FIGS. 1 to 4.

Figure 1:
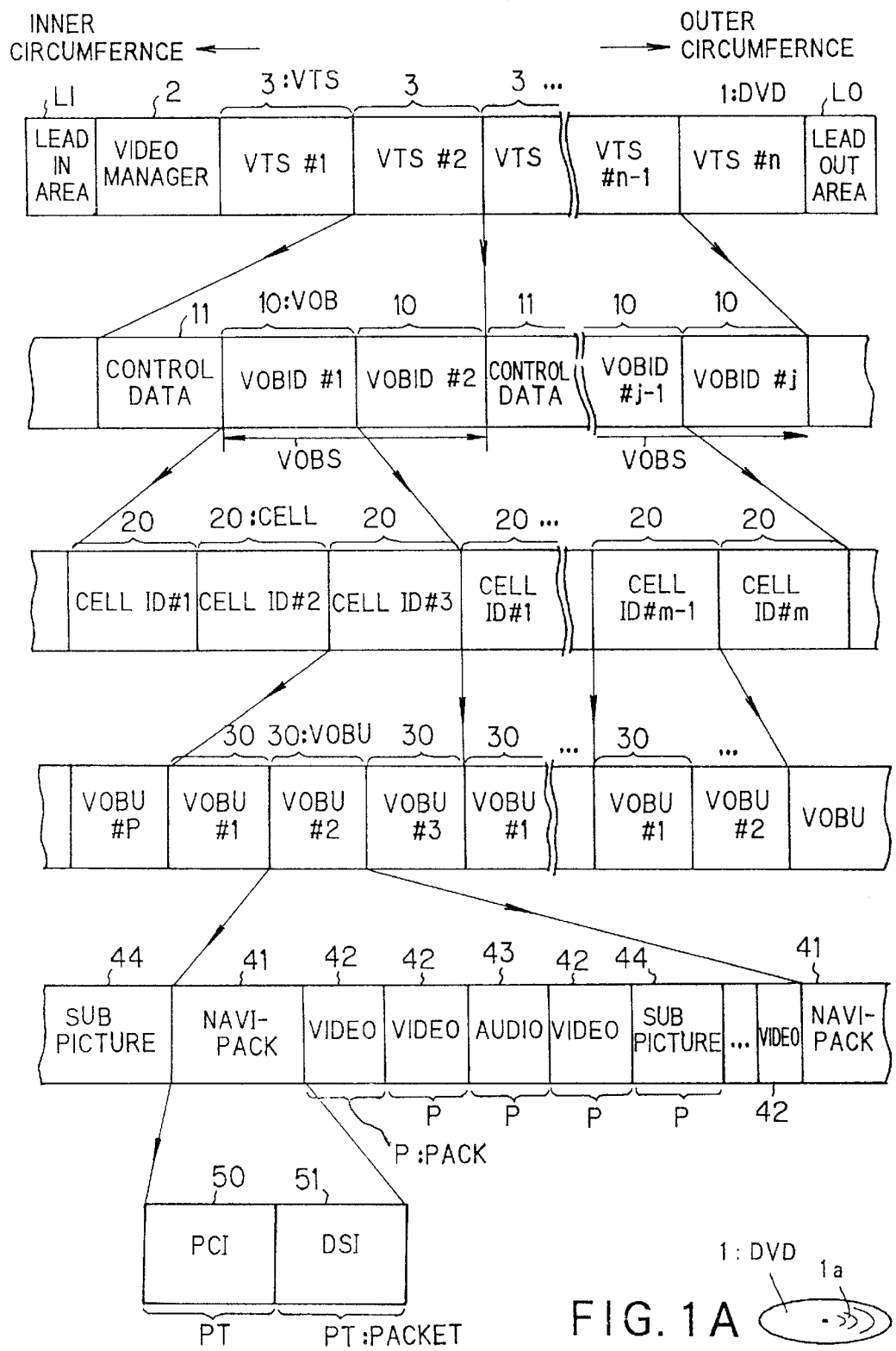
FIG. 1 is a diagram showing a physical structure of record information of a DVD as one embodiment of the present invention.

At first, a record format of video information and audio information on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

These video, audio and control informations are recorded on a spiral or coaxial record track 1a of the DVD 1 as shown in FIG. 1A.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while 32 kinds of sub pictures recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
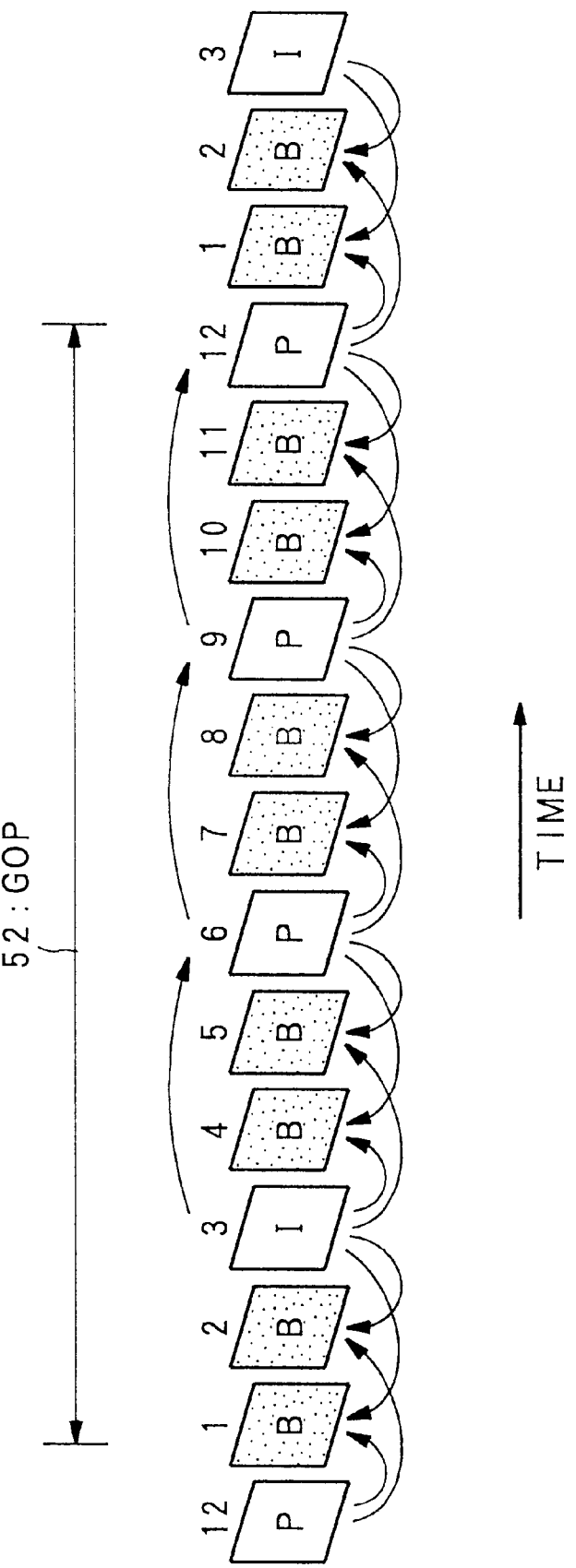
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
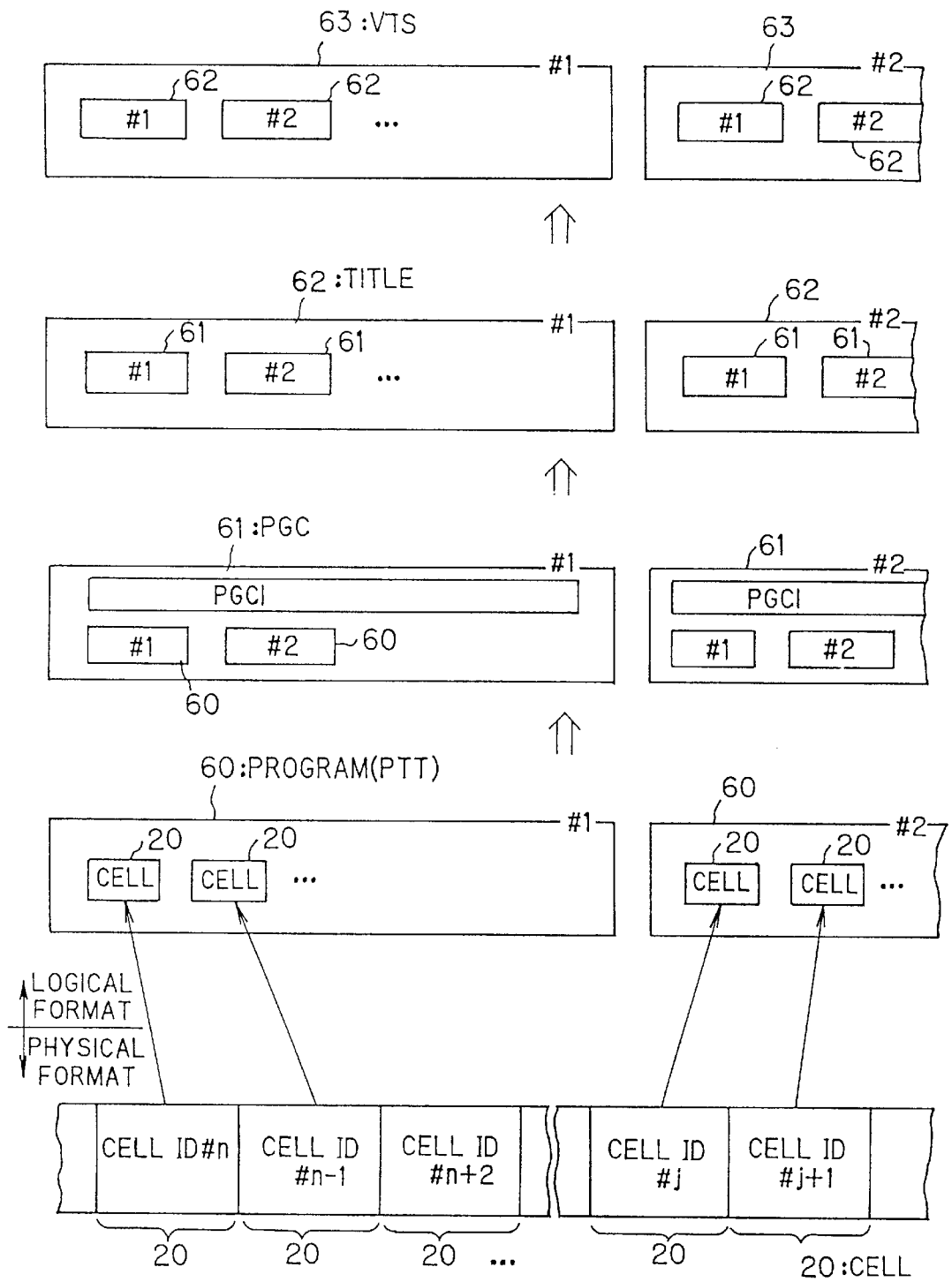
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
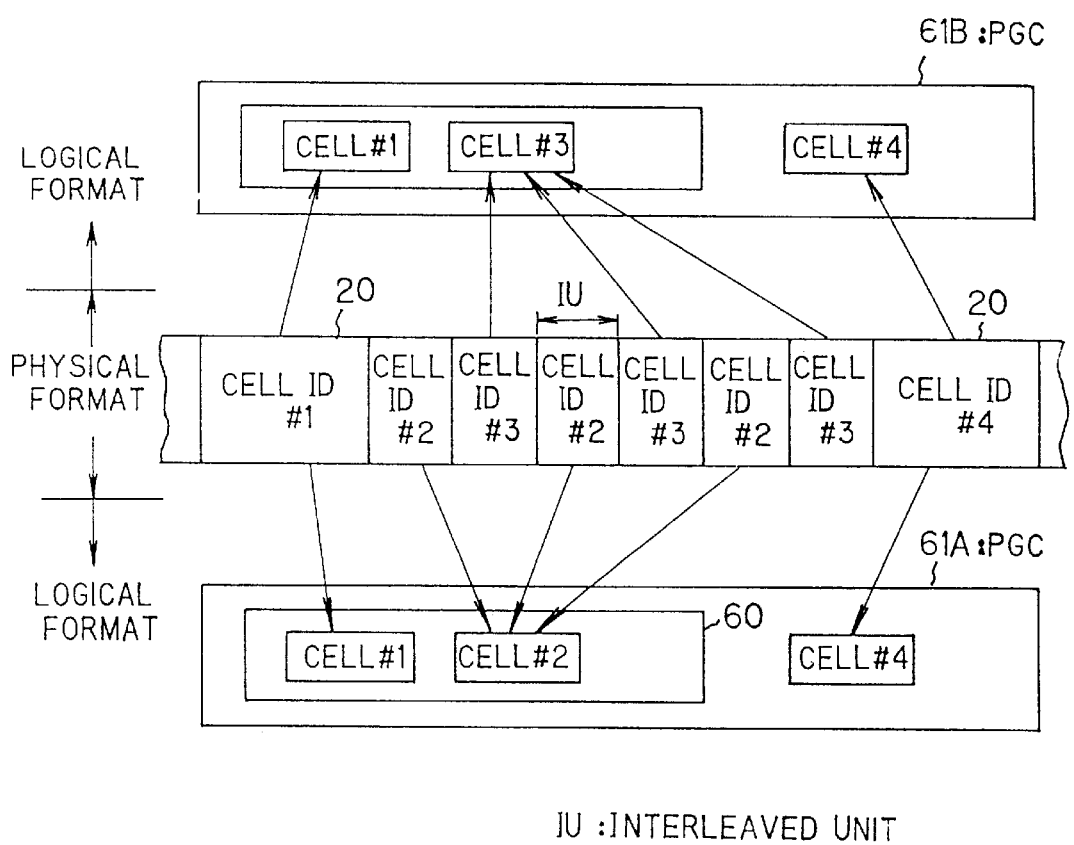
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Among various control informations having the physical and logical structure explained above, explanation will be made in more detail on: address information, which is constructed in each PGCI and indicates data address of each time unit (hereinbelow, referred to as "time unit address information"); cell information table constructed in each PGCI; and VOBU search information constructed in the DSI packet of each navi-pack.

First of all, the time unit address information will be described with reference to FIGS. 1 and 5.

Figure 5:
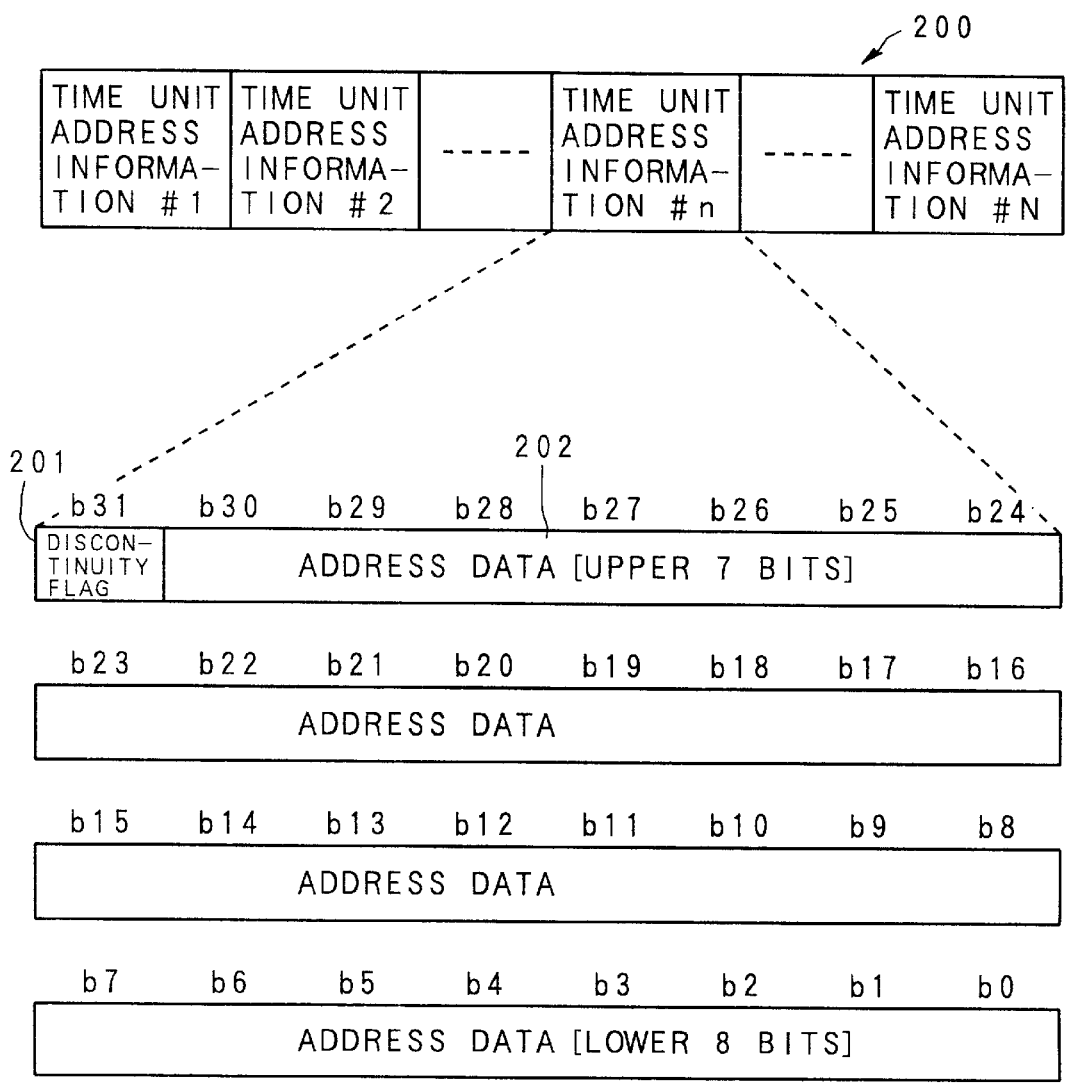
FIG. 5 is a diagram showing a data structure of time unit address information constructed in the DVD in FIG. 1.

Time unit address information 200 shown in FIG. 5 is written in each PGCI (ProGram Chain Information) which is included in the control data 11 recorded at the head of VTS 3 as shown in FIG. 1.

In FIG. 5, the time unit address information 200 is composed of time unit address information #1, #2, . . . , #n, . . . , #N of every pre-compression time unit (e.g., every 10 seconds) in each cell. The time unit address information #n indicates the leading or head address of the VOBU which includes the data-recorded position corresponding to the time address #n, i.e., the address of the navi-pack which is located at the head of the VOBU. In this context, "time unit" is a unit of time before the compression. Accordingly, by referring to the time unit address information 200, any VOBU located near the target VOBU, which has the data-recorded position corresponding to the designated time for the time search, can be identified with the degree of accuracy of the time unit (e.g., about 10 seconds). This is a so-called rough search.

In FIG. 5, each time unit address information #n consists of 32 bit data. In the embodiment, the first bit (leading bit) of time unit address information #n (n=1, . . . , N) represents discontinuity flag 201, and the subsequent 31 bits represent address data 202.

The address data 202 is binary data consisting of 31 bits of bits b0 to b30, which indicates the head or head address (i.e., the address of the navi pack) of the VOBU including the data-recorded location corresponding to the unit time #n.

The discontinuity flag 201 is one-bit data (bit b31), which indicates, by use of the value "0" or "1", whether or not the VOBU having the head address indicated by the time unit address #n and the next VOBU having the head address indicated by the next time unit address #n+1 are included in the same cell. Namely, the flag is set up (with bit value "1") if there is discontinuity of the cell between the current time unit address and the next time unit address. The flag is prepared by the author while recording the DVD.

Therefore, when reproducing the data from the information record medium by the information reproducing apparatus of the present invention, the time search can be conducted with using different kinds of algorithms depending on the cases, where the discontinuity flag is set up and where the discontinuity flag is not set up, by referring to this discontinuity flag. The algorithm used in the case of the OFF state of the discontinuity flag is relatively simple because it is sufficient to conduct a search within the same cell. Furthermore, since the cell has a relatively long time period or span in general (normally, several ten minutes, for example), the discontinuity flag is rarely set up. To this end, using different algorithms depending on the cases is very efficient for the time search.

If the author wants to prohibit a certain data from being reproduced during the time search (for example, with an educational program, when an "answer" is prohibited from being reproduced unless the "question" is read), the bit values of the time unit address information #n corresponding to the prohibited portion are all rendered "0" (i.e., all of the bits b0 to b30 of the address data 202 are made "0" in FIG. 5). Then, the next time unit address information #n+1 starts again from the time unit corresponding the part at which the reproduction prohibition is released. Accordingly, when reproducing the data by the information reproducing apparatus (which will be described later), if the portion corresponding to the time designated for the time search is prohibited from being reproduced by, for example, the unit of cell, the impossibility of search for that portion can be displayed on the display by referring to the time unit address information 200, thereby preventing the audience from actually executing the search operation (sliding the optical pickup to the target of the search) for the prohibited portion.

Nextly, the cell information table is explained with reference to FIGS. 1 and 6.

The PGCI contained in the control data 11 recorded at the head of VTS 3 shown in FIG. 1 is constructed to include the cell information table 300 shown in FIG. 6 for each of the plurality of cells included in the corresponding PGC.

In FIG. 6, the cell information table 300 contains C_CAT (Cell CATegory) data 301 of 4 bytes indicating the category of each cell, C_PBTM (Cell PlayBack TiMe) data 302 of 4 bytes indicating the time required for reproducing the cell, C_FVOBU_SA (Cell First VOBU Start Address) data 303 of 4 bytes indicating the start or head address of the first VOBU of that cell, and C_LVOBU_SA (Cell Last VOBU Start Address) data 304 of 4 bytes indicating the start or head address of the last VOBU of that cell. This allows the information reproducing apparatus (which will be described later) to identify the cell which contains the VOBU including the data-recorded position corresponding to the designated time for the time search, by referring to the cell information table 300 and the aforementioned time unit address information 200.

Although the example of the cell information table shown in FIG. 6 includes the start addresses of both the first and last VOBUs for each cell, it may contain the size of the cell (the number of bytes), in place of the start address of the last VOBU (C_LVOBU_SA data 304). This also has the same effect to easily identify the head address of the last VOBU of the cell.

Next, the VOBU search information is explained with reference to FIGS. 1, 7 and 8.

The DSI packet 51 in the navi-pack 41 has VOBU search information 400 indicating the head addresses of several to several hundreds VOBUs which are located adjacent to or apart from the VOBU 30 having the pertinent navi-pack 41 at the head thereof, as shown in FIG. 7.

In FIG. 7, the VOBU search information 400 lists the head addresses of the VOBUs 30, which are to be reproduced certain time units (e.g., (0.5 sec)×m (m=1, 2, ..., 240)) after the present VOBU 30 (forward), and the head addresses of the VOBUs 30, which are to be reproduced certain time units (e.g., (0.5 sec)×m (m=1, 2, ..., 240)) before the present VOBU 30 (backward), within the cell which contains the present VOBU 30, in association with the "m" values and the forward or backward. In the table of FIG. 7, "m time units (m=1, 2, ..., 240)" in the column "CONTENT" indicates the time period or span equal to m times of the predetermined time unit. The symbol "FWDA" in the column "DATA NAME" means that the data is located forward, while "BWDA" means that the data is located backward, and each of the numbers (1, 2, ..., 240) directly after these symbols FWDA and BWDA indicate the "m" value. Therefore, for example, "FWDA 60" implies the head address of the VOBU 30 which is to be reproduced (1 [unit time]×60) time units after (forward into the future of) the present VOBU 30 (i.e., the address corresponding to "HEAD ADDRESS OF VOBU FORWARD BY 60 TIME UNITS" in "CONTENT". Similarly, "BWDA 20" implies the head address of the VOBU 30 which is to be reproduced (1 [unit time]×20) time units before (backward into the past of) the present VOBU 30 (i.e., the address corresponding to "HEAD ADDRESS OF VOBU BACKWARD BY 20 TIME UNITS"). Each FWDA m data and each BWDA m data are 4 byte data, and the size of VOBU search information 400 is 152 bytes in total.

As described above, the VOBU search information 400 is completed within each cell. In other words, the VOBU search information 400 is valid only within the range of one cell which contains the DSI packet having the pertinent VOBU search information 400. Accordingly, in the DSI packets of the navi-packs included in the VOBUs located at both ends of the cell, the VOBU search information 400 becomes incomplete in halfway. If this is the case, "0" or "1" is arranged as for all of the bits in each portion which does containing any effective information. Alternatively, "0" is arranged as for all of the bits of forward data and "1" is arranged as for all of the bits of backward data, thereby indicating the nonexistence of the effective data in that portion of the VOBU search information 400 at a time of reproduction.

The reason why the VOBU search information 400 is completed within one cell is that the VOBU search information cannot be defined beyond the cell boundary if the PGC has an interactive structure. More particularly, if the PGC has such a cell branch structure as shown in FIG. 8, in which the reproduction proceeds from a cell #1 (e.g., a cell corresponding to a "question") to either a cell #2 (corresponding to the "correct answer") or a cell #3 (corresponding to a "incorrect answer"), and further proceeds to a cell #4 (corresponding to, e.g., the next "question"), it is unknown which VOBU should be reached from the cell #1 or returned from the cell #4 because the designation changes depending on the reaction of the audience (depending on whether the answer of the audience is "correct" or "incorrect"). For this reason, the VOBU search information 400 cannot be defined beyond the cell boundary.

The data structure of the DSI packet, which includes the VOBU search information 400 having the above explained structure, is explained with reference to FIG. 9.

Figures 8, 9:
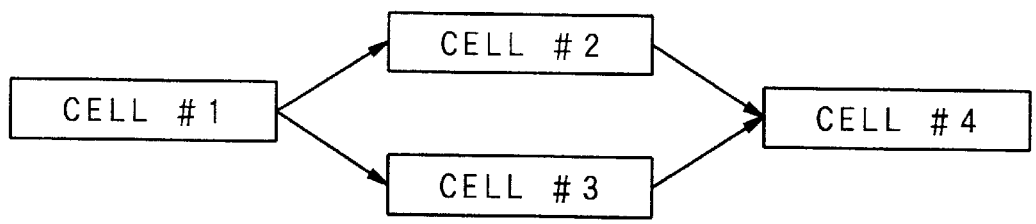
FIG. 8 is a diagram of a PGC having an interactive construction consisting of a plurality of cells of the DVD in FIG. 1.
FIG. 9 is a table showing a data structure of DSI constructed in the DVD in FIG. 1.

In FIG. 9, the information stored in the DSI packet is navigation information unique to each VOBU 30 to conduct the search and the seamless reproduction of the VOBU 30, which has the pertinent navi-pack 41 at the head thereof. For example, the navigation information includes: DSI general information of 32 bytes as general information for performing the search for the VOBU; seamless reproduction information of 146 bytes for performing the search in the seamless reproduction; angle information for the seamless of 36 bytes for seamlessly performing the angle reproduction; the VOBU search information 400 of 152 bytes as shown in FIG. 7; the information of 144 bytes for the synchronous reproduction; and reserved area of 507 bytes for system expansion. The DSI general information includes elapsed time information indicating the reproduction start time of the VOBU containing the pertinent DSI.

By referring to the VOBU search information 400 in the DSI packet of each navi-pack during the time search constructed in the above mentioned manner, the exact location of the target VOBU can be identified by use of the roughly searched VOBU, which has been roughly searched on the basis of the time unit address information 200, as a standard location, as long as the target VOBU is located within the same cell as the roughly searched VOBU.

As described above in detail, according to the embodiment of the present invention, the time unit address information 200 and the cell information table 300 are constructed in each PGCI, and the VOBU search information 400 is constructed in each DSI packet. Therefore, during the time search by the reproducing apparatus described later, if the cell is firstly judged to be continuous between the roughly searched VOBU and the target VOBU according to the discontinuity flag 201, the exact location of the target VOBU can be easily identified by use of the VOBU search information 400. If it is judged that there is a certain probability of the discontinuity of the cell between the roughly searched VOBU and the target VOBU, it is possible to conduct the actual search operation after performing a judging process as to whether or not the cell is really discontinuous. Then, if the judgment result indicates that the cell is continuous, the target VOBU can be easily identified similar to the situation where no discontinuity flag is set. On the other hand, if the judgment result indicates that the cell is discontinuous, after the VOBU to be roughly searched is moved forward or backward, the fine search for the target VOBU is performed.

Furthermore, by referring to the time unit address information 200, the information reproducing apparatus described later can identify the search prohibited portion by the unit of cell, for example, in advance of actually searching and reproducing the video data or audio data in the pertinent PGC, so that the access to the prohibited cell can be immediately stopped.

These functions and advantages of the record medium of the embodiment will be more apparent through the explanation for the operations of the reproducing apparatus of the present invention for reproducing the data from the DVD.

Since the DVD has such a large memory capacity as to store considerably complicated and large amount of information on the same optical disk, which is required when, for example, data is displayed in multiple ways depending on the "answer" input by the audience in response to the "question" displayed earlier, the above described recording format is especially efficient when applied to the DVD 1.

(II) Embodiment of Recording Apparatus

Next, an embodiment of recording apparatus for recording the above mentioned control information, video information and audio information onto the DVD 1 will be explained with reference to FIG. 10.

At first, a construction and an operation of the recording apparatus as the embodiment is explained with reference to FIG. 10.

Figure 10:
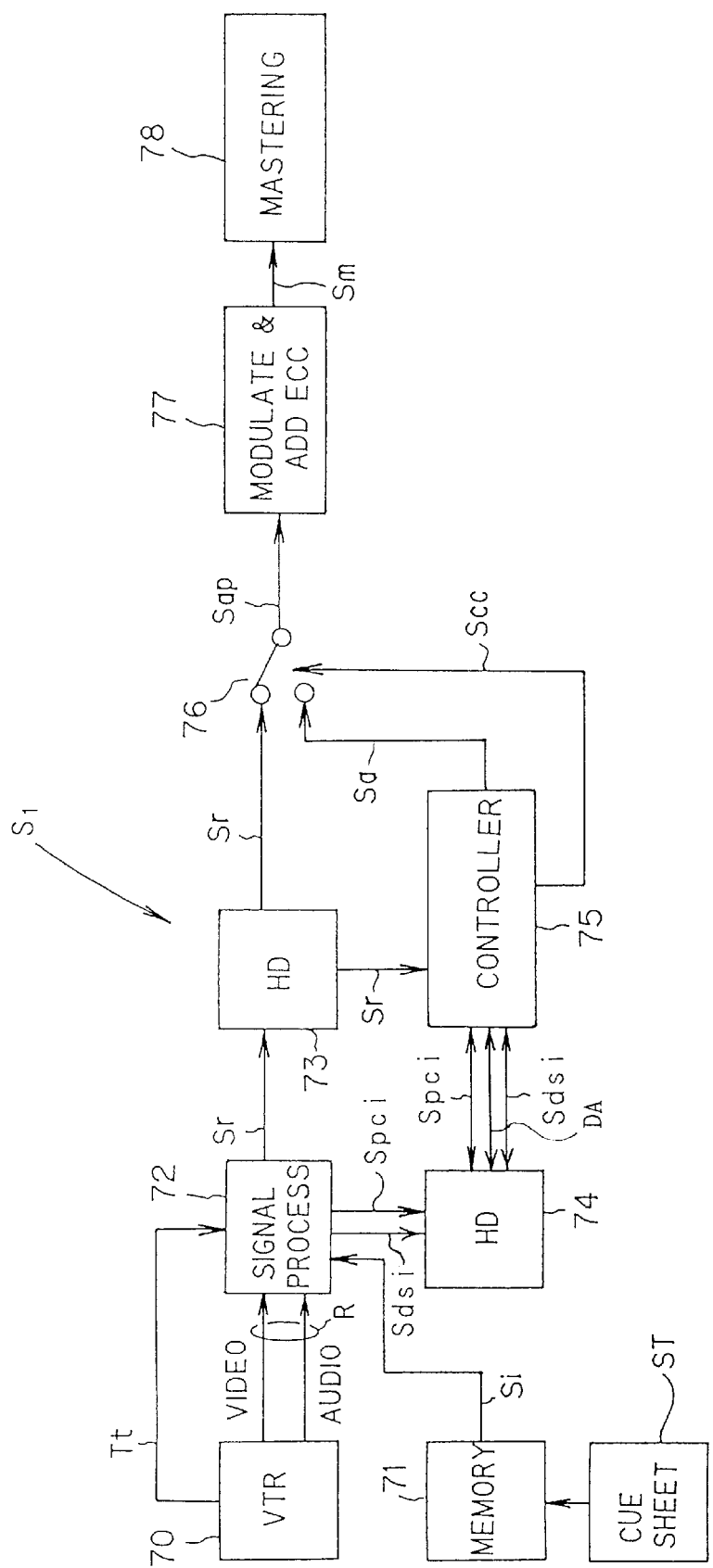
FIG. 10 is a block diagram of an information recording apparatus for recording the DVD in FIG. 1, as another embodiment of the present invention.

As shown in FIG. 10, a recording apparatus SI as the present embodiment is provided with: a VTR (Video Tape Recorder) 70; a memory 71; a signal process unit 71: a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the control information etc., defined by the author are written. Then, the memory 71 outputs it as a content information signal Si on the basis of a request from the signal process unit 72.

Then, the signal process unit 72 generates and outputs PCI information signal Spci and DSI information signal Sdsi, on the basis of the time code Tt corresponding to the record information R outputted from the VTR 70 and the control information signal Si outputted from the memory 71. Then, the PCI information signal Spci and DSI information signal Sdsi are temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the PCI information signal Spci and the DSI information signal Sdsi from the hard disk device 74, generates additional information DA on the basis of these read out signals, and temporarily stores the additional information DA into the hard disk device 74. This is because there may be control information, which content is determined in dependence upon a generation result of the compressed multiplexed signal Sr among various control informations. On the other hand, the controller 75 performs a time management for each of the operations of the signal process unit 72, the hard disk device 73 and the hard disk device 74, and reads out the additional information DA, which corresponds to the PCI information signal Spci and the DSI information signal Sdsi from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Next, detailed operations of the recording apparatus S1 for recording the time unit address information, the cell information table and the VOBU search information onto the master disk will be explained.

The controller 75 calculates, on the basis of the DSI information signal Sdsi and the compressed multiplexed signal Sr, the head address of the navi-pack corresponding to the compressed multiplexed signal Sr which constructs the VOBU of every pre-compression time unit (e.g., every 0.5 seconds) for the fine search, and successively generates each address data (FWDA 1, 2, . . . , and BWDA 1, 2, . . . ) which constructs the VOBU search information 400 of FIG. 7 such that it is completed within each cell. The generated each address data is temporarily stored as one portion of the additional information DA in a predetermined location of the hard disk drive 74. At this time, if there is no effective VOBU search information 400 at both ends of the cell, data sequence having the value "0" or "1" for all the bits is generated and stored. Alternatively, data may be generated and stored so that all the bits of forward data have the value "0" and all the bits of backward data have the value "1".

The controller 75 further calculates, on the basis of the DSI information signal Sdsi and the compressed multiplexed signal Sr, the head address of the navi pack corresponding to the compressed multiplexed signal Sr which constructs the VOBU of every pre-compression time unit for the rough search (e.g., every 10 seconds), and successively generates the address data 202 constructing the time unit address information 200 of FIG. 5. The generated address data 202 is temporarily stored in a predetermined location of the hard disk drive 74 as one portion of the additional information DA corresponding to each PGC. During this operation, it is judged whether or not the VOBUs indicated by the continuous address data 202 belong to the same cell. If they belong to different cells, the time unit address information 200 is generated with the discontinuity flag 201 ON. If they belong to the same cell, the time unit address information 200 is generated with the discontinuity flag 201 OFF.

Further, the controller 75 calculates the reproduction time of each cell, the head address of the navi-pack of the first VOBU in each cell and the head address of the navi-pack of the last VOBU in each cell so as to create the cell information table 300 of FIG. 6 for each PGC. The created cell information table 300 is temporarily stored as one portion of the additional information DA corresponding to each PGC, in a predetermined location of the hard disk device 74.

When the controller 75 outputs the information selection signal Scc to select the additional information DA consisting of the time unit address information 200 and the cell information table 300, which is to be stored in a predetermined location of the PGCI in the control data of each VTS, the multiplexer 76 is switched to the side of the additional information signal Sa. Then, the time unit address information 200 and the cell information table 300 are inputted to the modulator 77 as one portion of the additional information signal Sa which is to be multiplexed at this time, and is further inputted to the mastering device 78 as one portion of the disk record signal Sm.

When the controller 75 outputs another information selection signal Scc to select the additional information DA consisting of the VOBU search information 400, which is to be stored in a predetermined location of the DSI packet in the navi pack of the first VOBU in this VTS, the VOBU search information 400 is inputted to the modulator 77 as one portion of the additional information signal Sa which is to be multiplexed at this time, and is further inputted to the mastering device 78 as one portion of the disk record signal Sm.

Next, when the controller 75 outputs the information selection signal Scc to select the compressed multiplexed signal Sr which is to be written in the video packs and audio packs located following the navi pack, the multiplexer 76 is switched to the side of the compressed multiplexed signal Sr so as to successively input the video data and the audio data, which correspond to the VOBU search information 400 having been written in the DSI packet immediately before the video data and the audio data, to the modulator 77 as one portion of the information added compressed multiplexed signal Sap. This is further inputted to the mastering device 78 as one portion of the disk record signal Sm.

Successively, when the controller 75 outputs another information selection signal Scc to select the additional information DA consisting of the VOBU search information 400, which is to be stored in the DSI packet in the navi-pack of the next VOBU, the multiplexer 76 is switched to the side of the additional information signal Sa again. Then, the VOBU search information 400 is inputted to the modulator 77 as one portion of the additional information signal Sa being to be multiplexed, and is further inputted to the mastering device 78 as one portion of the disk record signal Sm.

These operations are repeated for a plurality of VOBUs, whereby the VOBU search information 400 of FIG. 7, which is completed within each cell, is stored in the DSI packet in the navi-pack of each VOBU, and the compressed multiplexed signal Sr is stored in each video pack, audio pack, . . . , in such a manner as to correspond to the navi pack, so that the recording operation for one VTS is completed. This recording operation is repeated for a plurality of VTSs. As a result, the time unit address information 200 of FIG. 5 and the cell information table 300 of FIG. 6 are constructed in the PGCI of the control data of each VTS, thereby finishing the recording of the DVD.

Thus, according to the information recording apparatus S1 of the present embodiment, the aforementioned master disk of the DVD 1 can be formed.

(III) Embodiment of Reproducing Apparatus

Next, an embodiment of reproducing apparatus for reproducing the information recorded on the DVD 1 by the above mentioned recording apparatus will be explained with reference to FIGS. 11 to 18.

At first, a construction and an operation of the reproducing apparatus as the embodiment is explained with reference to FIG. 11.

Figure 11:
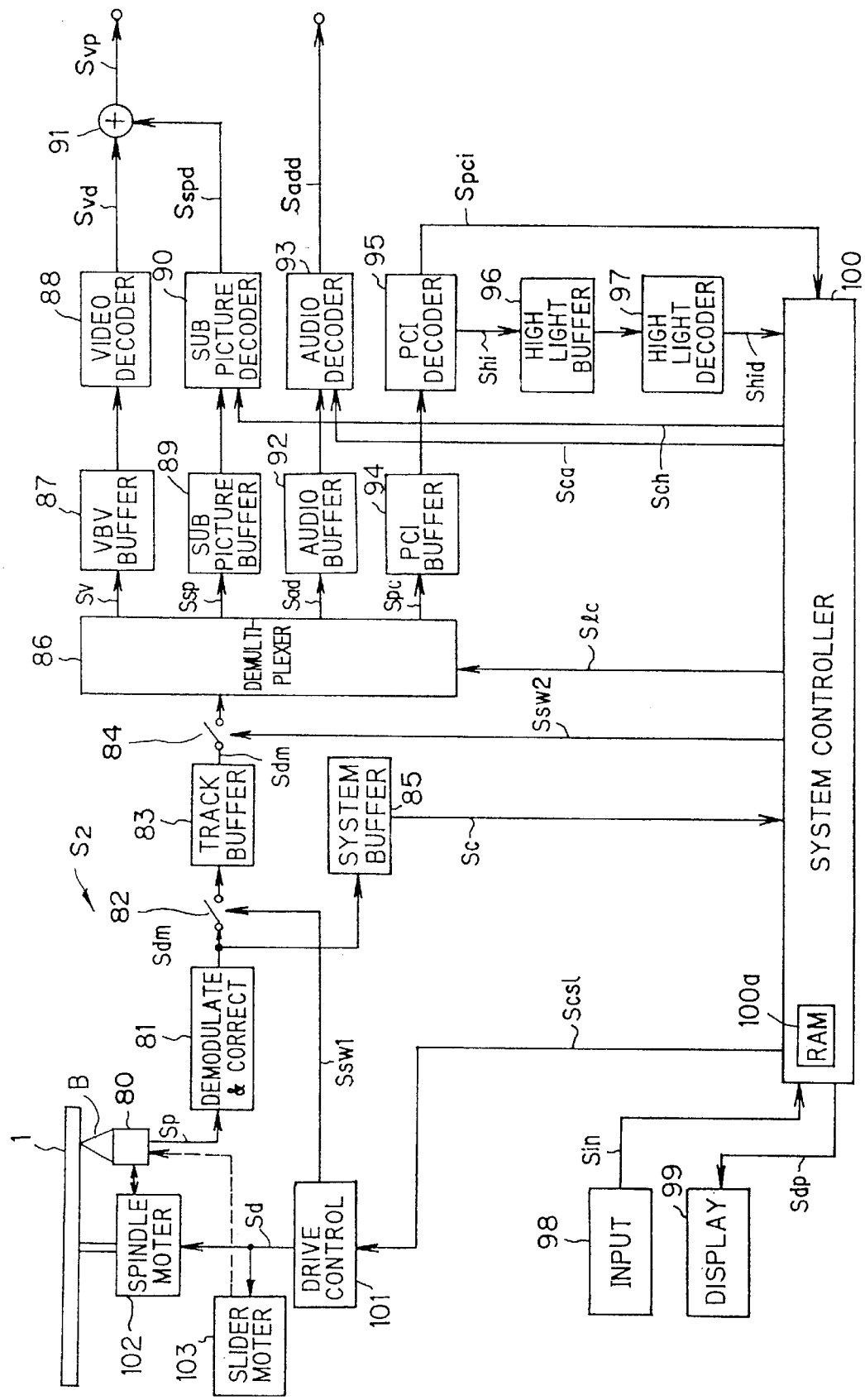
FIG. 11 is a block diagram of an information reproducing apparatus for reproducing the DVD in FIG. 1, as another embodiment of the present invention.

As shown in FIG. 11, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 11 only illustrates the portions related to the video and audio reproduction of the reproducing apparatus S2. The description and the detailed explanation as for servo circuits to servo control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as avideo signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scsl corresponding to the track jump process, to the drive controller 101, when it detects by the control signal Sc, the aforementioned DSI data etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 11), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

In the present embodiment, the system controller 100 is constructed to store the time unit address information (refer to FIG. 5) and the cell information table (refer to FIG. 6) written in the PGCI into an internal memory, such as a RAM (Random Access Memory) 100a shown in FIG. 11, prior to reproducing video images or audio sound of each PGC. Accordingly, the search for each time unit can be conducted promptly referring to these stored time unit address information and cell information table. Furthermore, the search prohibited portions in the information record medium can be identified before the actual search operation, on the basis of the judgment whether the stored time unit address has the bit values of "0".

Now, the time search conducted by the reproducing apparatus S2 will be explained below, while referring to the block diagram of FIG. 11 and the flowchart of FIG. 12.

Figure 12:
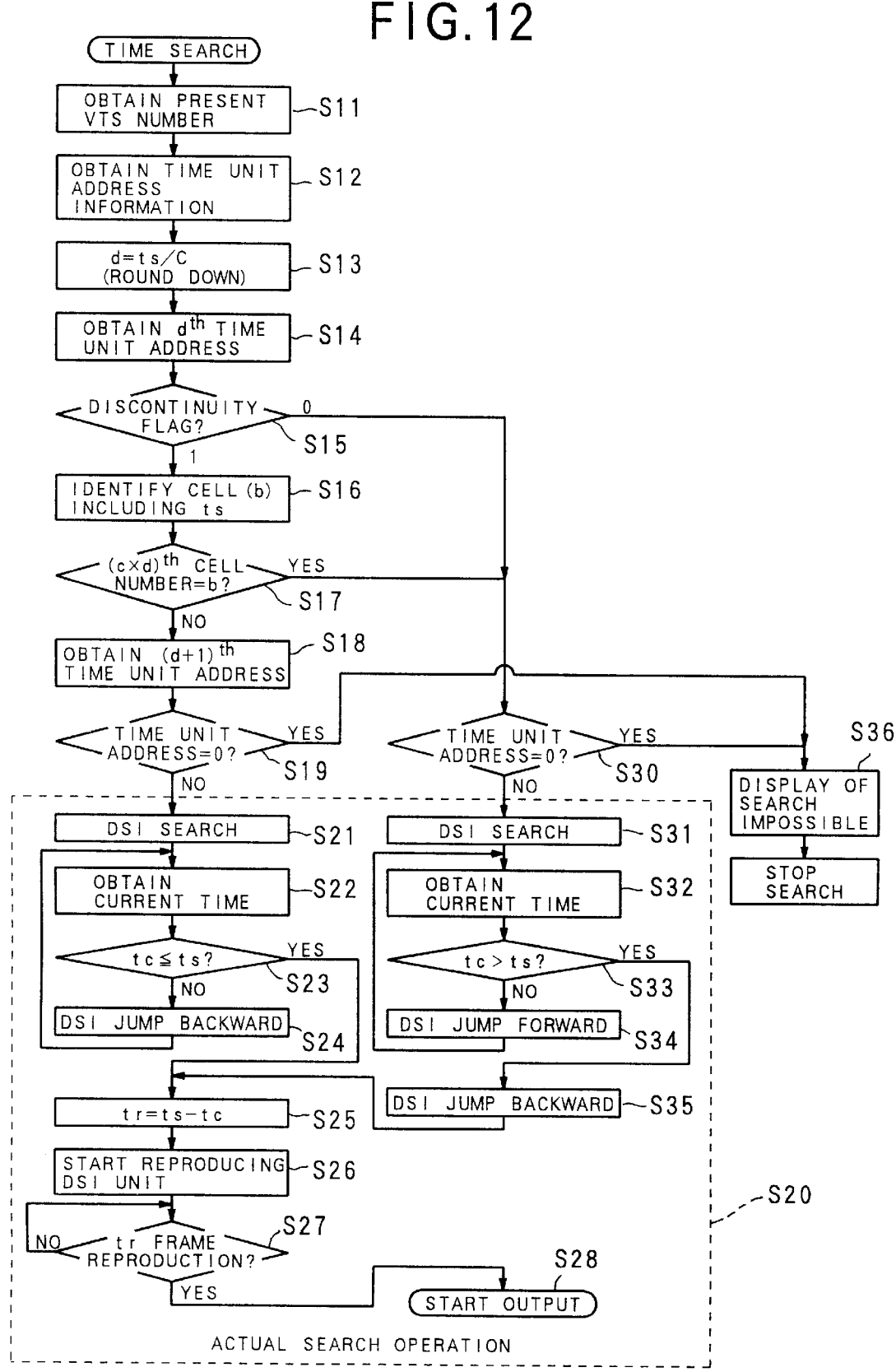
FIG. 12 is a flow chart showing a time search of the information reproducing apparatus in FIG. 11.

In FIG. 12, when the time search is requested by the audience through the input unit 98, the system controller 100 obtains the present VTS number as well as the present PGC number by referring to the control data of the VTS (Step S11). Then, the controller 100 further obtains the time unit address information 200 of FIG. 5 built in the PGCI stored in the control data of that VTS (Step S12). These processes at the steps S11 and S12 are executed such that the PGCI is reproduced prior to reproducing the substantial information, such as the video and the audio data, during the reproduction of each VTS regardless of the time search, and is stored into the RAM 100a, as one example of the memory means, built in the controller 75. However, the PGCI may be reproduced after the time search is designated.

Assuming that the target time designated for the time search is ts, and the unit time of the time unit address information is c (e.g., 10 seconds), the integer value of d expressed by the formula "d=ts/c" is calculated (the fractions are rounded down) (Step S13). According to this calculated integer value d, it is determined that the target address corresponding to the target time ts is the $d^{th}$ time unit address, so that the $d^{th}$ time unit address is obtained from the time unit address information 200 obtained at the Step S12 (Step S14). Namely, in this embodiment, the determination of the head address of the VOBU corresponding to the target time ts based on the above mentioned calculation formula and the time unit address information 200 is referred to as the "rough search for the VOBU". To obtain the integer value in the calculation formula, the fraction may be round off to the nearest whole number, or merely round up, instead of rounding down the decimals. Even in such cases, the time search can be achieved with the same efficiency by slightly modifying the algorithm described below.

Then, the system controller 100 judges whether the discontinuity flag 201 of FIG. 5 is in the ON state or OFF state, namely, whether the discontinuity flag 201 has the bit value "1" or "0" (Step S15).

Figure 13:
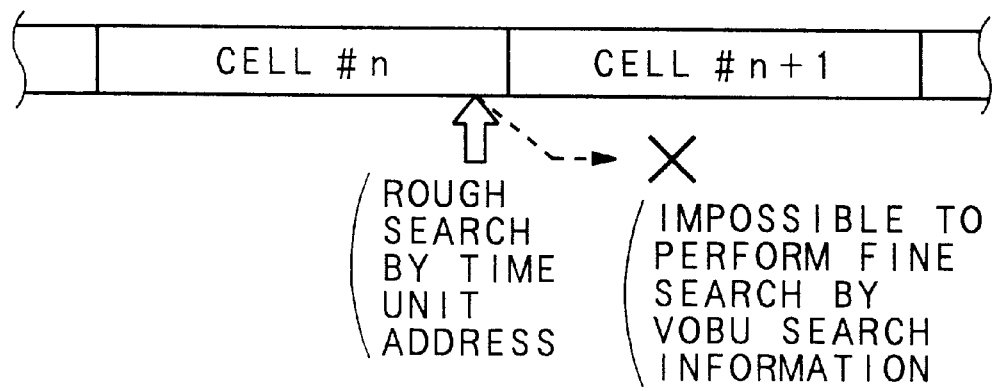
FIG. 13 is a diagram used for explaining the time search of the present invention.
Figure 14:
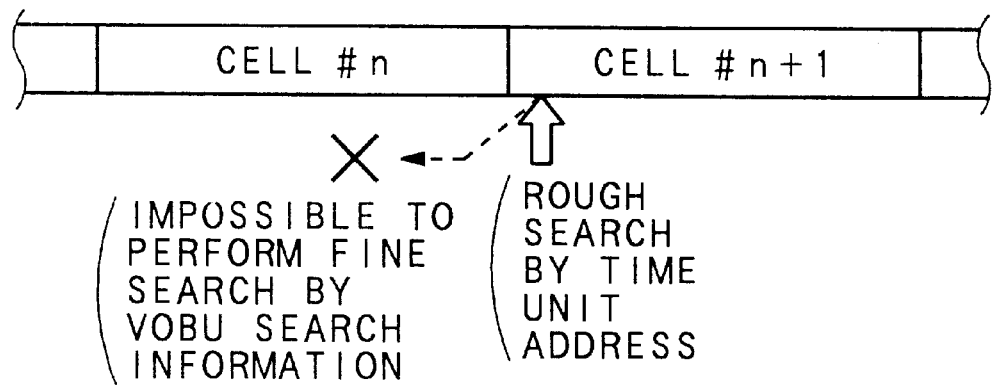
FIG. 14 is another diagram used for explaining the time search of the present invention.

If the bit value is "1", the cell to which the VOBU indicated by the $d^{th}$ unit time address is different from the cell to which the VOBU indicated by the $(d+1)^{th}$ unit time address. If this is the case, there is a probability that the cell including the VOBU identified through the rough search differs from the cell including the target VOBU which contains the data recording position corresponding to the target time ts. The reason why the wording of "probability" is used here is that there is also a probability that the target VOBU is located in the same cell as the roughly searched VOBU. Then, if the two cells differs from each other, the search information of the target VOBU does not exist in the VOBU search information of the roughly searched VOBU, because the VOBU search information stored in the DSI packet of each V/AVI-pack is completed within each cell, as aforementioned. Therefore, although the rough search can be conducted based on the time unit address, it is impossible to execute the fine search therefrom for the target VOBU based on the VOBU search information, as shown in FIGS. 13 and 14. This ends up the problem that the target VOBU cannot be found. In order to overcome this problem, according to the present embodiment, the fine search is conducted from the opposite direction based on the VOBU search information if the situation of FIGS. 13 or 14 occurs.

To this end, if the discontinuity flag is "1" at step S15, the cell which includes the target time ts is identified (Step S16). This identification process will be described in more detail below with an example of the case where three cells are involved.

| Cell Number | reproduction time | head address | end address |
| --- | --- | --- | --- |
| #1 | ta | ata | a1a |
| #2 | tb | atb | a1b |
| #3 | tc | atc | a1c |

These values can be obtained from the cell information table 300 shown in FIG. 6.

The judgment as to which cell (#1, #2, or #3) contains the target time ts of the time search is performed by comparing the value of "ts" with the following three values:

```
ts vs. ta;
ts vs. ta + tb; and
ts vs. ta + tb + tc.
```

Then, the $d^{th}$ time unit addess "as" is obtained based on the quotient "d" resulting from dividing "ts" by the time unit "c". The judgment as to which cell contains the $d^{th}$ address "as" is performed by comparing "as" with the following addresses:

```
as vs. ata and a1a;
as vs. atb and a1b; and
as vs. atc and a1c.
```

In this way, the cell which includes the target time ts can be identified at step S16.

Next, it is judged whether or not the cell number "c×d" (which is the cell number of the cell which includes the VOBU roughly searched based on the time unit address) is coincident with the cell number "b" obtained at the Step S16 (Step S17). If "c×d" is not coincident with "b" (Step S17: NO), the roughly searched VOBU and the target VOBU containing the target time ts are in the different cells. Therefore, the target VOBU containing the target time ts cannot be searched by use of the VOBU search information of the roughly searched VOBU, as has been explained using FIGS. 13 and 14. Therefore, the controller 100 obtains the $(d+1)^{th}$ time unit address (step S18). In this case, the VOBU indicated by the $(d+1)^{th}$ time unit address (i.e., the roughly searched VOBU) and the target VOBU containing the target time ts are in the same cell. Consequently, the target VOBU can be searched by use of the VOBU search information 400 (refer to FIG. 7) contained in the roughly searched VOBU.

Then, the system controller 100 judges whether or not the $(d+1)^{th}$ time unit address is "0" (step S19). As has been described, among the time unit address data 202 shown in FIG. 5, the data related to the cell which is prohibited by the author from being searched and reproduced has the bit value "0". Accordingly, if the address is "0" (step S19: YES), the system controller 100 displays the impossibility of the search on the display unit (step S36) and immediately stops the search operation. Thus, in case that a certain search operation is prohibited by the author, the search operation is stopped in the stage of preliminary processing by the system controller 100 prior to the actual search action (i.e. before sliding the pickup toward the search target), which is very convenient.

If the time unit address is not "0" at the step S19 (step S19: NO), the flow proceeds to a step S20 to perform the actual search operation, because the pertinent search is not prohibited in that area.

On the other hand, at the step S15, if the discontinuity flag indicates "0", the roughly searched VOBU and the target VOBU exist in the same cell, and therefore, the target VOBU can be searched based on the VOBU search information 400 contained in the roughly searched VOBU without causing the problems of FIGS. 13 and 14. Therefore, in this case, the flow branches to a step S30, where the system controller 100 judges whether or not the $d^{th}$ time unit address is "0", similar to the step S19. If the address value is "0" (step S30: YES), the impossibility of the search is displayed on the display unit (step S36), and the search is stopped.

On the other hand, if the time unit address is not "0" at the step S30 (step S30: NO), the flow proceeds to the step S20 to conduct the actual search operation.

The above explained steps S11 to S19 and the step S30 are preliminary process performed prior to actually moving the pickup toward the search target, in order to efficiently conduct the actual search operation by the system controller 100.

The actual search operation at step S20 will be described below.

Figure 15:
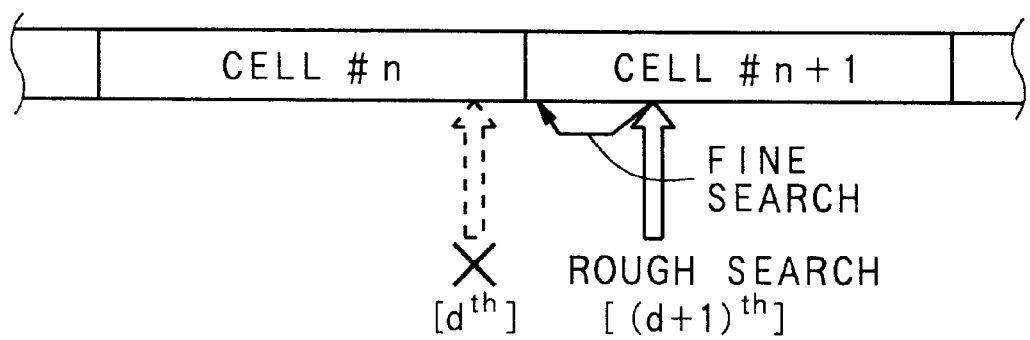
FIG. 15 is one diagram for explaining the time search of the information reproducing apparatus in FIG. 11.

Namely, when the flow proceeds to the step S20 from the step S19, the pickup is moved to the recording location of the DSI (navi-pack) corresponding to the $(d+1)^{th}$ time unit address under the control of the system controller 100 at a step S21. That is, the DSI corresponding to the $(d+1)^{th}$ time unit address is searched (step S21). Then, the current time tc of the roughly searched VOBU is obtained (step S22), and is compared with the target time ts (step S23). The current time tc is obtained by referring to the elapsed time information written in the DSI general information in the DSI. If tc≦ts is not satisfied at the step S23 (step S23: NO), the pickup is jumped backward by an amount corresponding to one DSI (VOBU) (step S24), and the process returns to the step S22. Namely, in this case, the rough search for the VOBU indicated by the $(d+1)^{th}$ time unit address is initially conducted, rather than the VOBU indicated by the $d^{th}$ time unit address, and from that roughly searched location, the fine search (the search for each VOBU) is conducted backward, as shown in FIG. 15.

On the other hand, if tc≦ts is satisfied at the step S23 (step S23: YES), the time difference tr between the target time and the current time is calculated according to tr=ts−tc (step S25), and the reproduction of the VOBU, to which the searched DSI belongs, starts along the record track on the disk (step S26). Then, at a step S27, the reproduction of the frame positioned in the recording location corresponding to the time difference tr from the head of the VOBU is waited for. When this frame is reproduced (step S27: YES), the output of the video image, the audio sound, the sub picture image, etc. is started from this frame through the display and the speaker (step S28).

Figure 16:
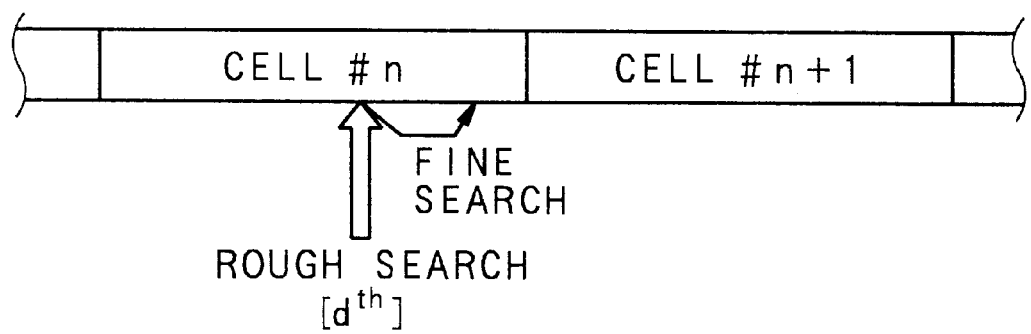
FIG. 16 is another diagram for explaining the time search of the information reproducing apparatus in FIG. 11.

On the other hand, if the process proceeds to the step S20 from the step S30, the pickup is moved toward the recording location of the DSI (navi-pack) corresponding to the $d^{th}$ time unit address under the control of the system controller 100 at a step S31. That is, the DSI corresponding to the $d^{th}$ time unit address is roughly searched (step S31). Then, the current time tc of the roughly searched VOBU is obtained (step S32), and is compared with the target time ts (step S33). If tc>ts is not satisfied (step S33: NO), the pickup is jumped forward by an amount corresponding to one DSI (VOBU) (step S34), and the flow returns to step S32. Namely, in this case, the rough search for the VOBU indicated by the $d^{th}$ time unit address is initially conducted, and from that roughly searched location, the fine search (the search for each VOBU) is conducted forward, as shown in FIG. 16.

On the other hand, if tc>ts is satisfied at the step S33 (step S33: YES), it is concluded that the one-previous VOBU is nothing else but the target VOBU. Thus, the pickup is jumped by an amount corresponding to one DSI (VOBU) backward (step S35) according to the DSI. Then, the flow proceeds to the step S25. Regarding the fine search, the remainder "e" of the calculation of d=ts/c at step S13 may be used. If this is the case, the VOBU is first roughly searched (based on the value "d") at the step S31, and the, fine search is conducted based on the remainder "e" i.e., conducted to the location advanced by "e" frames by using the VOBU search information.

As explained above, according to the information reproducing apparatus S2 of the present embodiment, the time search can be quickly conducted as a whole using a relatively simple algorithm.

To sum up, the time unit address information 200 (refer to FIG. 5) and the cell information table 300 (refer to FIG. 6) constructed in each PGCI, as well as the VOBU search information 400 (refer to FIG. 7) constructed in each DSI packet, are used for the search. If the discontinuity flag 201 indicates that the cell is continuous between the roughly searched VOBU and the target VOBU in the time search operation, the actual search operation S20 is suitably executed on an assumption that the target VOBU is searchable from the VOBU search information contained in the roughly searched VOBU (without executing the complicated comparing and calculating operations shown in steps S16 through S18). If the discontinuity flag 201 indicates that there is a probability of discontinuity of the cell between the roughly searched VOBU and the target VOBU, the steps S16 and S17 are firstly executed to determine whether or not the discontinuous part of the cells is located between the both VOBUs, and then, the roughly searched VOBU may be changed to the VOBU in the same cell as that contains the target VOBU, so that the actual search operation of the step S20 is suitably executed thereafter, as the occasion demands (step S18).

Furthermore, prior to the actual search operation (step S20), since the cells which is prohibited from being searched can be identified in advance by referring to the time unit address information 200 stored in the PGCI, the search for the prohibited cell can be promptly prevented.

Moreover, as compared with the related art methods of (I) through (III) described earlier, the memory capacity of system controller 100 of the reproducing apparatus S2 to store the VOBU search information becomes relatively small, e.g., about 152 bytes (refer to FIG. 7), if the VOBU search information is updated for each VOBU.

Figure 17:
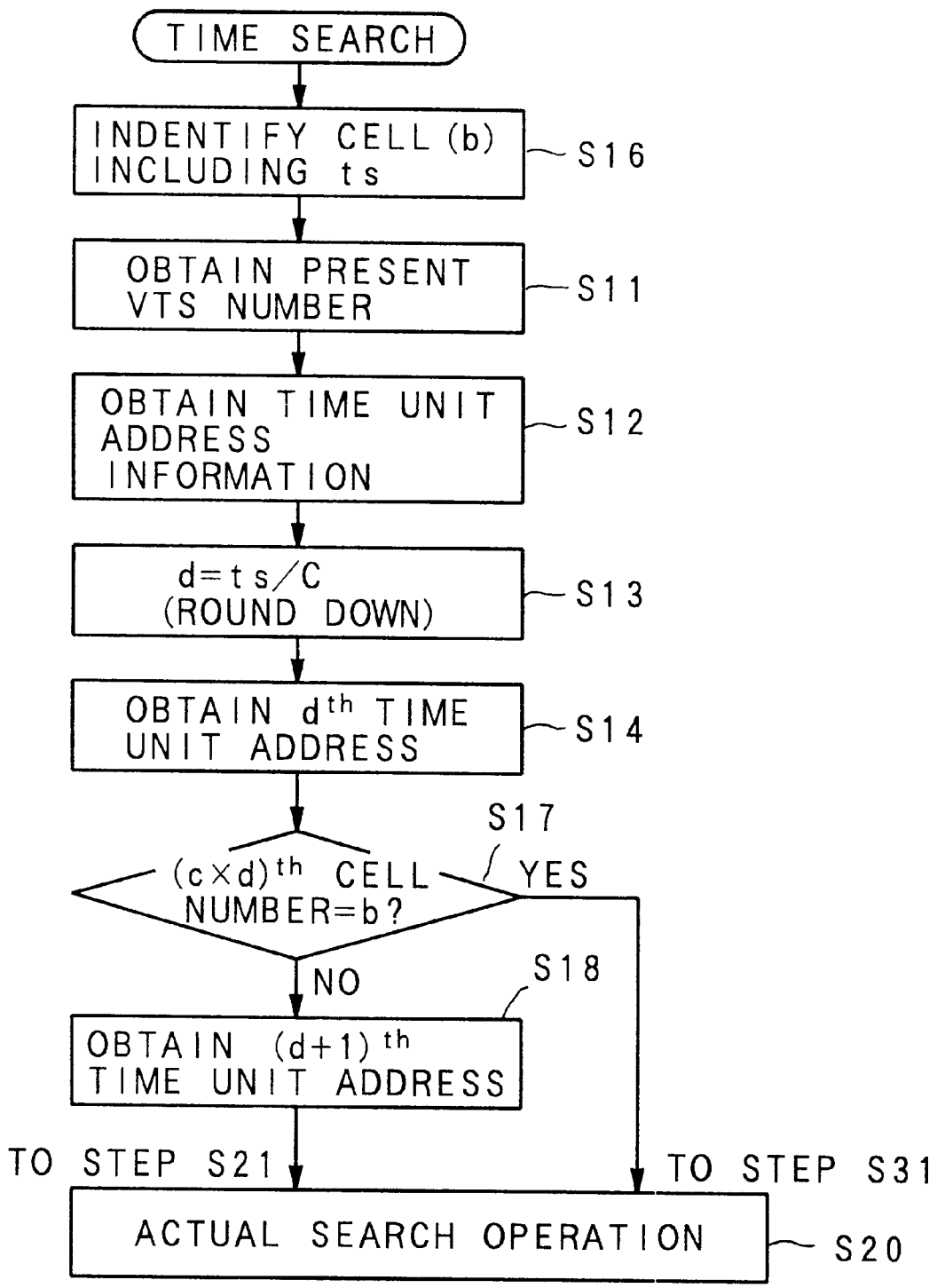
FIG. 17 is a flow chart showing the time search of a first comparison example of an information reproducing apparatus.

FIG. 17 shows the first comparison example in which the time search is conducted without using the discontinuity flag. In the figure, the same steps as those in the flowchart of FIG. 12 carry the same step numbers, and the explanation thereof are omitted.

In FIG. 17, when the time search is designated, for ever cases, the system computer 100 identifies the cell that contains the target time "ts" at the step S16. Then, the steps S11 to S14 are executed. After that, it is judged whether or not the roughly searched VOBU and the target VOBU are contained in the same cell at the step S17. Depending on the judgment result, the roughly searched VOBU may be changed to the VOBU in other cell (step S18), or may be maintained as it is, followed by the step S20 where the actual search operation is executed.

The first comparison example allows the reproducing apparatus to conduct the time search based on the time unit address information and the VOBU search information without causing the problems in FIGS. 13 and 14, even if the discontinuity flag is not used. Also, the memory capacity required for the reproducing apparatus is fairly small, as compared with the prior art methods (I), (II) and (III).

However, the processes of the steps S16 and S17 include a number of comparing and calculating operations, as aforementioned, imposing a large amount of load onto the hardware and software of the system controller 100. Also, it must be noted that the cell has a much longer time period or span, e.g. several tens minutes, as compared with the VOBU.

Suppose that three cells exist in a 120-minutes PGC and the time unit is 10 seconds, then 120×6=720 time unit addresses exist. Among them, only 3 addresses (0.4%) are located at the back ends of the three cells. In order to perform the special process for only these 3 addresses, the cumbersome steps S16 (identification of cell) and S17 (comparison of cell numbers), which impose large amount of load, must be applied to the remaining 717 addresses (99.6%). This method is inefficient as a whole.

On the contrary, according to the time search performed by the information reproducing apparatus S2 of the present embodiment, by referring to the discontinuity flag, the case in which the discontinuity flag is ON and the case in which the discontinuity flag is OFF are classified or grouped. And that, because the discontinuity flag is OFF in most of the cases, the cumbersome operations of the cell identification (step S16) and the comparison (step S17) can be greatly reduced, resulting in a reduced search time as a whole. This method is very efficient, as compared with the first comparison example.

Figure 18:
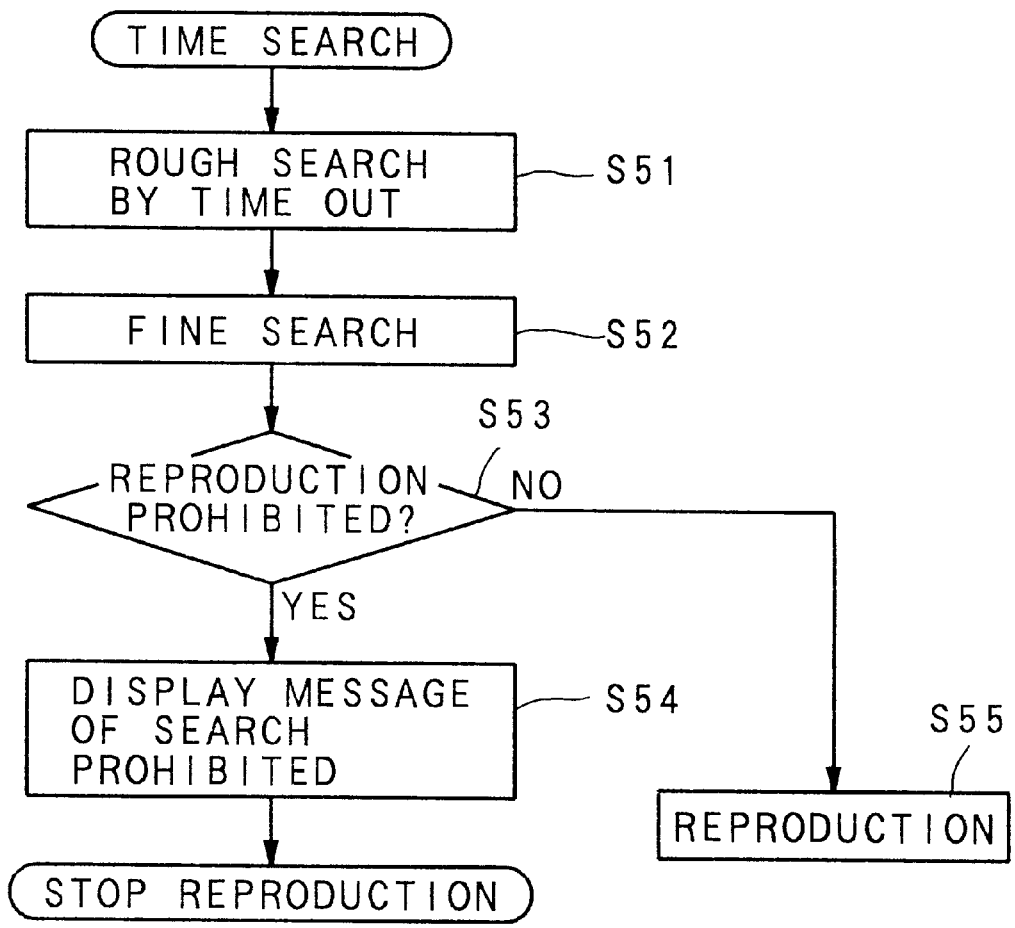
FIG. 18 is a flow chart showing the time search of a second comparison example of an information reproducing apparatus.

FIG. 18 shows a second comparison example, which is the time search for a DVD containing data recorded by a variable compression rate. This method was proposed in Japanese Patent Application No. H7-166025 filed by the applicant of the present invention, which has not been opened yet.

This application includes the following two techniques:
  (i) Additional information including reproduction prohibition information indicative of a reproduction condition is added in advance for every predetermined data group. The reproducing apparatus monitors if the reproduction condition defined by the reproduction prohibition information is satisfied (e.g., a predetermined reproduction procedure has been executed, or a reproduction of a "question" has been completed). If it is judged that this reproduction condition is not satisfied, the video data and the audio data following that reproduction prohibition information is prohibited from being reproduced.
  (ii) Additional information including reproduction prohibition information indicative of a standard value to permit a reproduction is added in advance for every predetermined data group. At the same time, the reproducing apparatus has a reproduction acceptable level determined according to the reproduction operating condition to that software by the audience. Based on the comparison between the standard value included in the reproduction prohibition information and the reproduction acceptable level, the video data and the audio data following the reproduction prohibition information is prohibited from being reproduced.

In these techniques (i) and (ii), the reproduction prohibition information is added for every predetermined data group. As shown in a flowchart of FIG. 18, when the time search is designated, the rough search is firstly conducted on the basis of the time unit (step S51), and then the fine search is actually conducted on the basis of the compressed unit (step S52). Only after the pickup, which has been moved to the searched part of data group, starts reading the data (i.e. in real time), it is judged whether or not the reproduction of that information is prohibited by referring to the reproduction prohibition information written in that searched part (step S53). If the reproduction of that information is prohibited (S53: YES), the impossibility of this search operation is displayed on the display unit (step S54), and the reproduction operation is stopped. In other words, the impossibility of search is not displayed until this stage. On the other hand, if the reproduction is not prohibited (S53: NO), data is reproduced from the searched position (step S55).

In this way, according to the second comparison example, before displaying the search impossibility on the display unit, the pickup is actually moved by the slider motor to the recorded location corresponding to the designated time. Thus, it takes considerable time to start displaying and that, the search result may be in vain of the search impossibility, which is unpleasant for audience.

On the contrary, according to the time search of the information reproducing apparatus S2 of the present embodiment, it is possible to figure out the reproduction prohibited part promptly, simply by checking the contents of the time unit address information, which has the value "0" if the reproduction is prohibited. Thus, impossibility of the search can be immediately displayed on the display unit and the search can be stopped before the pickup is actually moved to the target, without giving uncomfortableness to the audience even if the search result is in vain of the search impossibility.

As discussed above in detail, it should be understood through the first and second comparison examples how the reproducing apparatus S2 is superior in the present technical field.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information record medium having a record track recorded with record information to be reproduced by an information reproducing apparatus, which comprises a read means, performs a reproduction of the record information while relatively moving the read means along the record track and is able to perform a time search by moving the read means across the record track on the basis of access information to access the record information, the information record medium comprising a data structure stored in the information record medium and including:

the record information and the access information being recorded on the record track in a plurality of first data groups, each of which is a unit able to be accessed by the information reproducing apparatus and each of which comprises the record information corresponding to a first time unit and the access information, said plurality of first data groups being further grouped into a plurality of second data groups, each of which is a unit able to be logically reproduced by the information reproducing apparatus and each of which comprises a series of the first data groups arranged along the record track among the first data groups; and management information collectively recorded at one portion of the record track, comprising a plurality of time unit address data respectively indicating addresses of a sub-group of the plurality of first data groups that are chosen from the plurality of first data groups in every second time unit larger than the first time unit, each time unit address data including discontinuity information indicating whether the first data group, the address of which is indicated by the time unit address data, belongs to a same one of said second data groups as an adjacent member of the sub-group of the plurality of first data groups;

the access information in each of the first data groups comprising first data group search information indicating addresses of the series of the first data groups, which belong to a same one of the second data groups as the first data group including the access information.

2. An information record medium according to claim 1, wherein the time unit address data are recorded such that, if the time search into one of the second data groups which contains one address indicated by one of the time unit address data is to be prohibited, the one address is written by use of a specific value that can be recognized by the information reproduction apparatus as a prohibition of the time search.

3. An information record medium according to claim 1, wherein said management information comprises second data group information indicating a reproduction time of each second data group, an address of respective one of said first data groups which is located at a head of said each second data group, and an address of respective one of said first data groups which is located at an end of said each second data group.

4. An information record medium according to claim 1, wherein at least a part of the record information is compressed and recorded on the record track with variable compression rate, and the first and second time units are defined in terms of a pre-compression time unit.

5. An information recording apparatus for recording information onto an information record medium having a record track recorded with record information to be reproduced by an information reproducing apparatus, which comprises a read means, preforms a reproduction of the record information while relatively moving the read means along the record track and is able to perform a time search by moving the read means across the record track on the basis of access information to access the record information, the information recording apparatus comprising:

an access information generation unit that generates the access information corresponding to the record information; and a recording unit that records the record information and the access information onto the record track as a plurality of first data groups, each of which is a unit able to be accessed by the information reproducing apparatus and each of which comprises the record information corresponding to a first time unit and the access information, the plurality of first data groups being further grouped into a plurality of second data groups, each of which is a unit able to be logically reproduced by the information reproducing apparatus and each of which comprises a series of the first data groups arranged along the record track among the first data groups, the recording unit further recording management information collectively at one portion of the record track, wherein the management information comprises a plurality of time unit address data respectively indicating addresses of a sub-group of the plurality of first data groups that are selected from the plurality of first data groups in every second time unit larger than the first time unit, each time unit address data including discontinuity information indicating whether the first data group, the address of which is indicated by the time unit address data, belongs to a same one of said second data groups as an adjacent member of the sub-group of the plurality of first data groups, the recording unit further recording first data group search information so as to be included in the access information in each of the first data groups, wherein the first data group search information indicates addresses of the series of the first data groups, which belong to a same one of the second data groups as the first data group including the access information.

6. An information recording apparatus according to claim 5, further comprising an input unit that inputs a search prohibit information to prohibit the time search into an arbitrary one of the second data groups, the recording unit recording the time unit address data such that, if the time search into one of the second data groups which contains one address indicated by one of the time unit address data is to be prohibited by the search prohibit information, the one address is written by use of a specific value that can be recognized by the information reproduction apparatus as a prohibition of the time search.

7. An information recording apparatus according to claim 5, wherein the recording unit compresses and records at least a part of the record information on the record track with variable compression rate, and the first and second time units are expressed in terms of a pre-compression time unit.

8. An information reproducing apparatus for reproducing information present on an information record medium comprising a data structure stored in the information record medium and including: record information to be reproduced and access information for use by the information reproducing apparatus to perform a time search for the record information in accordance with a target time, the record information and the access information being recorded on a record track of the information record medium such that the record information and the access information are divided into a plurality of first data groups, each of which is a unit able to be accessed by the information reproducing apparatus and each of which comprises the record information corresponding to a first time unit and the access information, the plurality of first data groups being further divided into a plurality of second data groups, each of which is a unit able to be logically reproduced by the information reproducing apparatus and each of which comprises a series of the first data groups arranged along the record track among the first data groups, the record medium further including management information collectively recorded at one portion of the record track, wherein the management information comprises a plurality of time unit address data respectively indicating addresses of a sub-group of the first data groups that are chosen from the plurality of first data groups in every second time unit larger than the first time unit, each time unit address data including discontinuity information indicating whether the first data group, the address of which is indicated by the time unit address data, belongs to a same one of the second data groups as an adjacent member of the sub-group of the plurality of first data group, wherein the access information in each of the first data groups comprises first data group search information indicating addresses of the series of the first data groups, which belong to a same one of the second data groups as the first data group including the access information, the information reproducing apparatus comprising:

a reading unit that reads information recorded at a predetermined read position on the record track;

a movement unit that causes relative movement between the reading unit and the record track;

a demodulator that demodulates the information read by the reading unit;

a specifying unit that specifies a temporary target time corresponding to one of the time unit address data in accordance with the target time for the time search;

a target setting unit that (i) determines whether the discontinuity information included in the one of the time unit address data indicates a continuity or discontinuity when the temporary target time is specified by the specifying unit, (ii) sets an address of the first data group indicated by the one of the time unit address data corresponding to the temporary target time as an initial search target if it is determined to indicate the continuity, (iii) determines whether the first data group, the address of which is indicated by one of the time unit address data, and the first data group corresponding to the target time belong to the same one of the second data groups if it is determined to indicate the discontinuity, (iv) sets the address indicated by the one of the time unit address data corresponding to the temporary target time as the initial search target if the two first data groups in the step (iii) are determined to be in the same one of the second data groups, and (v) sets an address, which is apart by one second time unit from the address indicated by the one of the time unit address data corresponding to the temporary target time, as the initial search target if the two first data groups in the step (iii) are determined not to be in the same one of the second data groups; and a control unit that controls the movement unit, the reading unit and the demodulator to (i) move the reading unit to the initial search target, (ii) read and demodulate the first data group search information included in the access information of the first data groups located at the initial search target, and (iii) further cause relative movement between the reading unit and the read track toward the address corresponding to the target time from the initial search target within the second data group to which the initial search target belongs in accordance with the demodulated first data group search information.

9. An information reproducing apparatus according to claim 8, in which the time unit address data are recorded such that, if the time search into one of the second data groups which contains one address indicated by one of the time unit address data is prohibited, the one address is written by use of a specific value that can be recognized by the information reproduction apparatus as a prohibition of the time search, wherein:

the target setting unit determines whether or not the address indicated by the one of the time unit address data corresponding to the temporary target time has the specific value, when the target time is specified by the specifying unit; and the control unit performs no control to move the reading unit to the initial search target if it is determined to have the specific value by the target setting unit.

10. An information reproducing apparatus according to claim 8, in which the management information comprises second data group information indicating a reproduction time of each second data group, an address of a respective one of the first data groups which is located at a head of said each second data group, and an address of respective one of the first data groups which is located at an end of said each second data group, wherein the target setting unit determines whether the first data group, the address of which is indicated by the one of the time unit address data corresponding to the temporary target time, and the first data group corresponding to the target time belong to the same one of the second data groups, on the basis of the second data group information.

11. An information reproducing apparatus according to claim 8, wherein:

the control unit controls the reading unit, movement unit, and demodulator to read and demodulate the time unit address data and the discontinuity information in advance of moving the reading unit toward the initial search target; and the target setting unit comprises a memory for storing the time unit address data and the discontinuity information demodulated in advance, and performs the determinations by use of the stored data and information.

12. An information reproducing apparatus according to claim 8, wherein at least a part of the record information is compressed and recorded on the record track with a variable compression rate, and the first and second time units are expressed in terms of a pre-compression time unit, and wherein the demodulator expands and demodulates the record information read by the reading unit.

13. An article of manufacture comprising:

a medium readable by an information reproducing apparatus, a plurality of first data groups substantially sequentially recorded on the medium, each of the first data groups including reproduction signals to be reproduced by the information reproducing apparatus and search data recorded physically adjacent to the information reproduction signals, the plurality of first data groups being further grouped into a plurality of second data groups each of which can be logically recognized by the information recording apparatus; and management information collectively stored at one portion of the medium, the management information including addresses of a subset of the plurality of first data groups that are distributed among the plurality of first data groups with intervals larger than the interval between any two of the first data groups adjacent to each other, the management information further including discontinuity data indicating whether any particular member of the subset of the first data groups belongs to the same second data group as an adjacent member of the subset, wherein the search data in each first data group includes addresses of the adjacent first data groups belonging to the same second data group as the first data group including the search data.

14. The article of manufacture according to claim 13, wherein the management information includes a predetermined data indicating prohibition of access, if such access to particular one of the first data groups is to be prohibited.

15. The article of manufacture according to claim 13, wherein the management information includes a reproduction time of each second data group, an address of the first data group located at a head of each second data group, and an address of the first data group located at an end of each second data group.

16. The article of manufacture according to claim 13, wherein at least some portions of the reproduction signals are compressed and recorded on the medium with variable compression rates, and the management information and the access data correspond to the addresses of the respective first data groups and pre-compression reproduction times.

17. A method for searching for desired information in a medium readable by an information reproduction apparatus, the medium substantially sequentially storing a plurality of first data groups thereon, each of which includes reproduction signals and search data recorded physically adjacent to the reproduction signals, the plurality of first data groups being further grouped into a plurality of second data groups each of which can be logically recognized by the information recording apparatus, the medium further having management information collectively stored at one portion of the medium, the management information including addresses of a subset of the plurality of first data groups distributed among the plurality of first data groups with intervals larger than the interval between any two of the first data groups adjacent to each other, the management information further including discontinuity data indicating whether any particular member of the subset of the first data groups belongs to the same second data group as an adjacent member of the subset, wherein the search data in each first data group includes addresses of the adjacent first data groups belonging to the same second data group as the first data group including the search data, said method for searching the desired information comprising the steps of:

inputting a target reproduction time;

processing the target reproduction time to select a temporary target first data group from the subset of the first data groups;

reading the management information from the medium to determine whether the temporary target first data group belongs to the same second data group as an adjacent member of the subset of the first data groups;

selecting a preliminary target first data group from the subset of the first data groups in accordance with the determination made in the step of reading the management information;

reading the search data in the preliminary target first data group to obtain the address of the first data group corresponding to the target reproduction time; and accessing the first data group corresponding to the target reproduction time in accordance with the address obtained in the step of reading the search data.

* * * * *